US010277351B2

(12) United States Patent
Takei

(10) Patent No.: US 10,277,351 B2
(45) Date of Patent: Apr. 30, 2019

(54) WIRELESS COMMUNICATION SYSTEM, SHIELDED YARD WIRELESS COMMUNICATION SYSTEM, AND WIRELESS COMMUNICATION DEVICE

(71) Applicant: HITACHI, LTD., Tokyo (JP)

(72) Inventor: Ken Takei, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/821,910

(22) Filed: Nov. 24, 2017

(65) Prior Publication Data

US 2018/0152258 A1    May 31, 2018

(30) Foreign Application Priority Data

Nov. 28, 2016    (JP) .................................. 2016-229764

(51) Int. Cl.
| | | |
|---|---|---|
| *H04J 13/00* | (2011.01) |
| *H04J 13/12* | (2011.01) |
| *H01Q 25/00* | (2006.01) |
| *H01Q 1/52* | (2006.01) |

(52) U.S. Cl.
CPC ......... *H04J 13/004* (2013.01); *H01Q 25/001* (2013.01); *H04J 13/12* (2013.01); *H01Q 1/526* (2013.01)

(58) Field of Classification Search
CPC ....... H04L 27/26; H04L 25/497; H04B 1/707; H04B 7/10; H04B 1/69; H04B 1/70735; H04J 13/004; H04J 13/12; H01Q 25/001
See application file for complete search history.

(56) References Cited

U.S. PATENT DOCUMENTS

| | | | |
|---|---|---|---|
| 6,128,330 A | 10/2000 | Schilling | |
| 2005/0025099 A1* | 2/2005 | Heath, Jr. ............ | H04B 7/0613 370/334 |
| 2006/0067531 A1* | 3/2006 | Yamazaki ............... | H04L 9/065 380/239 |

(Continued)

FOREIGN PATENT DOCUMENTS

| | | |
|---|---|---|
| JP | 2002-135189 A | 5/2002 |
| JP | 2006-094215 A | 4/2006 |

OTHER PUBLICATIONS

Singaporean Office Action received in corresponding Singaporean Application No. 10201709789 dated Mar. 1, 2018.

*Primary Examiner* — Aristocratis Fotakis
(74) *Attorney, Agent, or Firm* — Mattingly & Malur, PC

(57) ABSTRACT

In a wireless communication system, wireless communication devices are disposed, each including two orthogonal antennas, a transmitter, and a receiver using rotating polarized wave having a changeable transmission frequency. Specific codes are assigned to the devices, respectively and are shared. In a first of the devices, information and a first code are superimposed on a first carrier wave. In a second of the devices, the transmitted wave is received to reproduce the information with the codes assigned to the second device and the shared code assigned to the first device. The second device transmits second information through modulation using the code thereof. Each of the first and second devices adjusts the propagation frequency for a maximum ratio in intensity of a signal reproduced with the code assigned to another device to an intensity of a signal reproduced with the code assigned to the own device.

13 Claims, 10 Drawing Sheets

(56) References Cited

U.S. PATENT DOCUMENTS

| | | | |
|---|---|---|---|
| 2007/0298716 A1* | 12/2007 | Takei | H04B 7/10 455/42 |
| 2010/0309861 A1* | 12/2010 | Gorokhov | H04B 1/7103 370/329 |
| 2011/0206095 A1* | 8/2011 | Beeler | H04B 7/18515 375/211 |
| 2016/0182185 A1* | 6/2016 | Takei | H04L 27/0002 455/42 |

* cited by examiner

WIRELESS COMMUNICATION SYSTEM, SHIELDED YARD WIRELESS COMMUNICATION SYSTEM, AND WIRELESS COMMUNICATION DEVICE

CROSS REFERENCE TO RELATED APPLICATION

This application claims the foreign priority benefit under Title 35, United States Code, § 119(a)-(d) of Japanese Patent Application No. 2016-229764, filed on Nov. 28, 2016 in the Japan Patent Office, the disclosure of which is herein incorporated by reference in its entirety.

BACKGROUND OF THE INVENTION

1. Field of the Invention

The present invention relates to a wireless communication system, a shielded yard wireless communication system using the same, and a wireless communication device therefor.

2. Description of the Related Art

There are infrastructure systems isolated from externality.

An example is a nuclear power plant. In the nuclear plant, a reactor and a control room are sheltered with thick concrete walls, and the facility is constructed to secure physical safety at peacetime and in emergency.

In this situation, to strengthen the shielding against an outside, it is not preferable to provide mechanical communication paths in the shielding member for cables, etc. If possible, it is required to provide a communication means by wireless communication technology without any mechanical change in the shielding member.

Since the shielding member made of concrete, etc to isolate the control room from the control object has generally a loss for electromagnetic waves, if a thickness of the shielding member is large, propagation of the electromagnetic energy from transmission point to the reception point becomes insufficient due to attenuation of the electromagnetic energy (electromagnetic field energy). Accordingly, this is a problem in securing a preferable communication quality.

Main factors in attenuation of the electromagnetic energy are a reflection phenomenon of electromagnetic waves generated between different materials having a small loss such as the air and a material having a large loss, such as the concrete and water and an attenuation phenomenon during propagation of the electromagnetic waves transmitting through the material having a large loss.

The latter phenomenon, i.e., the attenuation in propagation of the electromagnetic wave, can be reduced by decreasing a frequency used in the communication.

However, since an efficient of radiating the electromagnetic wave by an antenna, which is a device for transmitting and receiving the electromagnetic wave, decreases in inverse proportion to the frequency, there is a lower limit to decrease the transmission frequency. The lower limit is several hundred MHz if an actually usable antenna has a dimension of tens centimeters.

Patent Document 1 of JP 2006-094215 A discloses a technology of wireless communication receiving device as a means for solving the problem.

JP 2006-094215 A disclosed increase in a receiving performance with reduction of a processing quantity at a column of "problem", and that an estimating means 105 estimates existence of a plurality of paths based on the received signal at a column of "solving means". A rake combining means 117 performs rake processing of transmission path estimation, phase amplitude correction, and back diffusion processing for each signal corresponding to each path, and synthesizes a plurality of signals undergone the rake processing. A frequency equalizing means 118 performs frequency equalizing processing for a signal described by Fourier transformation of the received signal, and back diffusion processing is performed for the processed signal. An operation selecting means 105 operates either of the rake combining means and frequency equalizing means based on the existence situation of a plurality of paths. JP 2006-094215 A disclosed this as the technology of the wireless communication receiving device (see ABSTRACT).

As described above, in the technology disclosed in JP 2006-094215 A, an electrical resonating part and electrodes are formed between a solid material having a loss and an antenna, and minimization of reflection between the air having a low loss and the material having a loss is made by adjusting the resonation frequency of the electrical resonating part and adjusting a distance between the electrodes and the solid material. This reduces the loss due to the reflection between both materials.

PATENT DOCUMENT

Patent document 1: JP 2006-094215 A

SUMMARY OF INVENTION

However, the method using fine adjustment of the distance between the electrode and the solid material as described in the technology disclosed in JP 2006-094215 A has generally an extremely low resistance against aged deterioration deformation of the device and deformation by external force. Accordingly, there is a problem in providing adjustment-free at peace time and automatic recovering for the deformation in emergency.

Particularly, it is impossible to apply the technology to the infrastructure systems requiring severe requirements for safe operation of the device at peace time and in emergency.

The present invention has been made in consideration of the problems to provide a wireless communication system which is capable of adjustment-free at peace time and has the automatic recovering function for deformation in emergency to perform wireless communication with transmission through a shielding member having a loss.

Further, there is a problem in providing shielded yard wireless communication system used in a yard having shielding members.

Further, it is a problem in providing a wireless communication device used in the wireless communication system and the shielded yard wireless communication system.

To solve the problems, the present invention provides a wireless communication system including:

a plurality of wireless communication devices disposed, each of wireless communication devices including two antennas having a spatially non-parallel relation with each other, a transmitter, and a receiver, the transmitter and the receiver transmitting and receiving rotating polarized waves while the transmitter and the receiver vary propagation frequencies, respectively;

wherein specific codes are assigned to the wireless communication devices, respectively; and wherein the wireless communication devices share specific codes respectively assigned to the wireless communication devices;

at least a first device of the wireless communication devices that superimposes first information together with the specific code of the first wireless communication device as an own device therefor and the shared specific code of another device therefor on a propagation frequency to generate and transmit a first superimposed signal as an electromagnetic wave which is a rotating polarized wave;

at least a second device of the wireless communication devices that receives the electromagnetic wave as a received signal and reproduces from the received signal the first information with the specific code assigned to the second wireless communication device as an own device therefor and the shared specific code assigned to the first wireless communication device as another device therefor;

wherein the second device superimposes second information together with the specific code of the second wireless communication device as the own device therefor and the specific code of the first communication device as the another device therefor on a propagation frequency to generate and transmit a second superimposed signal as an electromagnetic wave which is a rotating polarized wave;

wherein each of the first and second wireless communication devices adjusts the propagation frequency of the own device therefor so as to have a maximum ratio of an intensity of a signal reproduced from the received signal thereof with the specific code assigned to the another wireless device therefor to an intensity of a signal reproduced from the received signal thereof with the specific code assigned to the own device therefor.

Other means are described in the embodiments.

According to the present invention, a wireless communication system capable of communication through the shielding material having a loss is provided, which can perform communication through the shielding material having a loss with adjustment-free at peace time and has the automatic recovering function against deformation in emergency.

Further, a shielded yard wireless communication system in the yard having shielded materials is provided.

Further, the wireless communication devices used in the wireless communication system and the shielded yard wireless communication system are provided.

DETAILED DESCRIPTION OF THE INVENTION

Embodiments of the present invention are described below, referring to drawings.

First Embodiment

A wireless communication system of a first embodiment according to the present invention is described below, referring to FIG. 1 in which wireless communication is made by transmission of electromagnetic waves through a medium of a shielding member.

Figure 1:
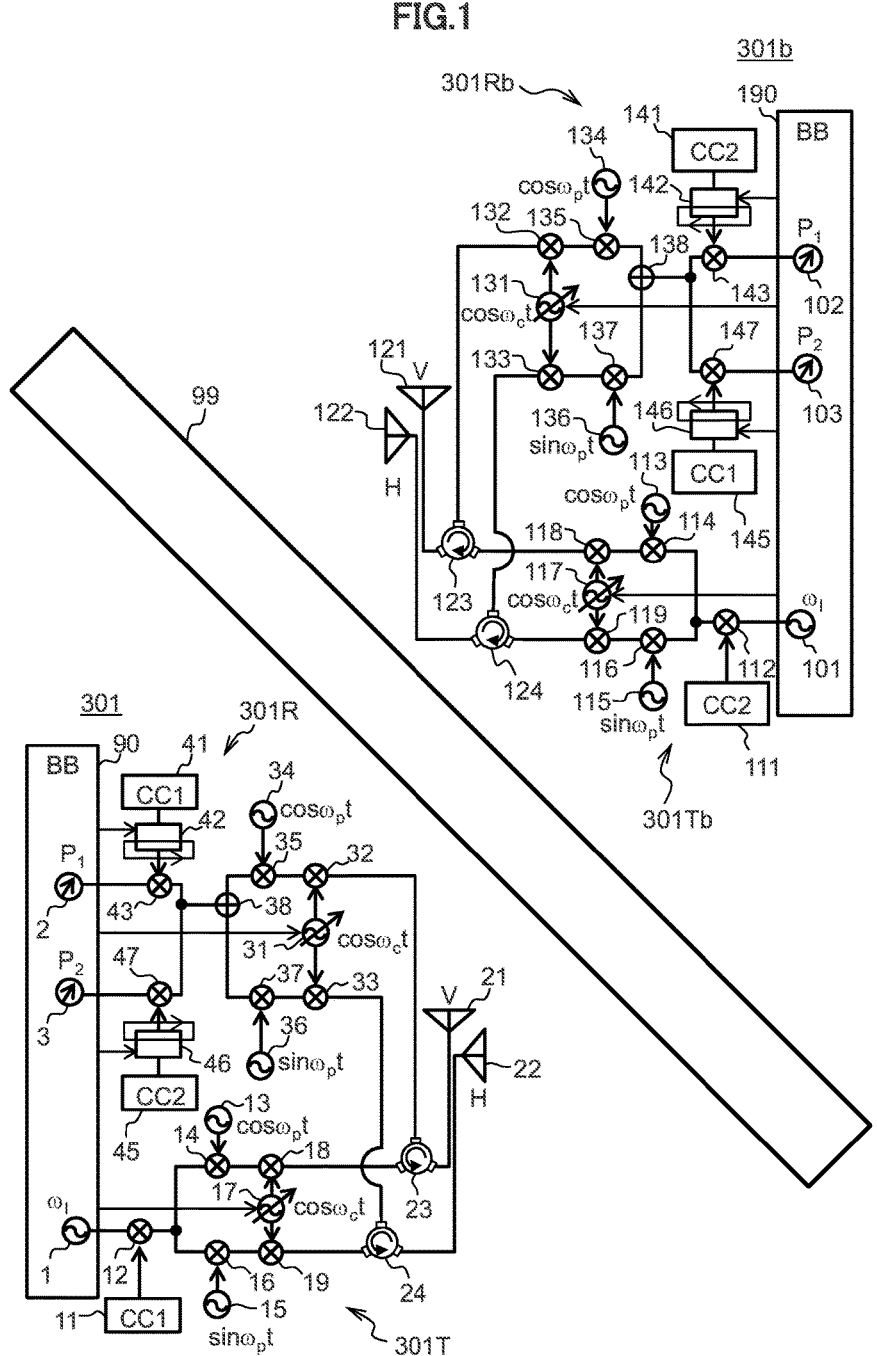
FIG. 1 is a block diagram of a wireless communication system according to a first embodiment of the present invention.

FIG. 1 is a block diagram of an example of a wireless communication system according to a first embodiment of the present invention.

In FIG. 1, a wireless communication system is shown in which wireless communication is performed between a first wireless communication device 301 and a second wireless communication device 301b through a shield member (shielding material) 99.

The wireless communication device 301 and the second wireless communication device 301b have the same configuration except a part described later. Accordingly, the configuration of the wireless communication device 301 is mainly described.

Wireless Communication Device 301

The wireless communication device 301 is configured including a transmitter 301T, the receiver 301R, a first antenna (V) 21, a second antenna (H) 22, circulators 23, 24, and a baseband circuit (BB) 90

The first antenna (V) 21 and the second antenna (H) 22 have both of the functions of transmission and reception antennas by switching by the circulators 23 and 24.

The baseband circuit 90 includes an information signal generator ($\omega_I$) 1 used for transmission, an own device code demodulation result measurement circuit 2 used for receiving, and an another device code demodulation result measurement circuit 3.

Configuration of Transmitter 301T

The transmitter 301T includes a transmission circuit, and the first antenna (V) 21 and the second antenna (H) 22 for transmission. The transmission circuit includes the information signal generator ($\omega_I$) 1, a first transmission code generator (CC1) 11, transmission multipliers 12, 14, 16, 18, 19, a rotating polarized wave frequency cosine wave generator 13, a rotating polarized wave frequency sine wave generator 15, and a variable frequency transmission carrier generator 17.

As described above, the first antenna (V) 21 and the second antenna (H) 22 are used as transition antennas 21 and 22 by switching functions of the circulators 23, 24.

Outline of Components' Functions in Transmitter 301T

The information signal generator ($\omega_I$) 1 generates an information signal transmitted by the transmitter 301T in the wireless communication system.

The transmission multipliers 12, 14, 16, 18, 19 are used for superimposing two signals (modulation and spreading).

The first transmission code generator (CC1) 11 generates a special pulse train indicating autocorrelation function and cross-correlation function, etc.

The code (specific code: CC1) generated by the first transmission code generator (CC1) 11 is assigned to the own device (the wireless communication device 301 or the transmitter 301T).

The rotating polarized wave frequency cosine wave generator 13 generates a signal of cos $\omega_C t$, and the rotating polarized wave frequency sine wave generator 15 generates a signal of sin $\omega_C t$. Combining these signals creates a rotating polarized wave rotating with time, in which polarized waves are radiated as electromagnetic waves by the antennas having an orthogonal relation, as described later.

The variable frequency transmission carrier generator 17 generates a carrier wave (cos $\omega_C t$) for transmitting the information signal ($\omega_I$) as a magnetic electric wave. The variable frequency transmission carrier generator 17 is controlled by the baseband circuit 90 to control the frequency ($\omega_C$) of the carrier wave (cos $\omega_C t$).

The first antenna (V) 21 and the second antenna (H) 22 are polarizing antennas both radiating polarized waves during transmission.

The first antenna (V) 21 and the second antenna (H) 22 are spatially orthogonally disposed. More specifically, the first antenna (V) 21 is disposed to radiate an output polarized wave in vertical direction, and the second antenna (H) 22 is disposed to radiate an output polarized wave in the horizontal direction.

More specifically, the vertical direction and the horizontal direction are not absolute directions having a reference direction in this embodiment, but the first antenna (V) 21 and the second antenna (H) 22 are disposed having a spatially orthogonal relation.

As described above, the first antenna (V) 21 and the second antenna (H) 22 are switched between the transmission antennas and the reception antennas by the circulators 23, 24.

Connection Configuration of Elements in Transmitter 301T

In the transmitter 301T of the wireless communication device 301, an output signal of the information signal generator ($\omega_I$) 1 is inputted into a first input of the transmission multiplier 12.

A second input of the transmission multiplier 12 receives the transmission code (CC1) of the first transmission code generator (CC1) 11, the information signal ($\omega_I$) is spread by superimposing (multiplying) the transmission code (CC1) thereon.

An output signal of the transmission multiplier 12 is divided into two.

One of the divided signals is inputted into a first input of the transmission multiplier 14.

Another of the divided signals is inputted into a first input of a transmission multiplier 16.

A second input of the transmission multiplier 14 receives a cosine wave (cos $\omega_P t$) of the rotating polarized wave frequency cosine wave generator 13 to superimpose the cosine wave (cos $\omega_P t$) on the output of the transmission multiplier 12.

An output signal of the transmission multiplier 14 is inputted into a first input of a transmission multiplier 18. A second input of the transmission multiplier 18 receives the carrier wave (cos $\omega_C t$), and the transmission multiplier 18 superimposes the carrier wave (cos $\omega_C t$) (modulation, up-converting) on the output signal of the transmission multiplier 14.

An output signal of the transmission multiplier 18 is inputted into a first port of the circulator 23.

A second input of the transmission multiplier 16 receives a sine wave (sin $\omega_P t$) of the rotating polarized wave frequency sine wave generator 15, and the transmission multiplier 16 superimposes (modulating) the sine wave (sin $\omega_P t$) on the output of the transmission multiplier 12.

An output signal of the transmission multiplier 16 is inputted into the first input of a transmission multiplier 19. A second input of the transmission multiplier 19 receives a carrier wave (cos $\omega_C t$) of the variable frequency transmission carrier generator 17, and the transmission multiplier 19 superimposes (modulates, up-converts) the carrier wave (cos $\omega_C t$) on the output signal of the transmission multiplier 16.

An output signal of the transmission multiplier 19 is inputted into a first port of the circulator 24.

The first antenna (V) 21 receives the electric signal through the circulator 23, converts into electromagnetic wave, and spatially radiates the electromagnetic wave.

The second antenna (H) 22 receives the electric signal through the circulator 24 converts an electromagnetic wave, and spatially radiates the electromagnetic wave.

In the transmitter 301T configured as mentioned above, the first antenna (V) 21 outputs a signal in which the transmission code (CC1), the cosine wave (cos $\omega_P t$), and the carrier wave (cos $\omega_C t$) are superimposed (up-converted) on the information signal ($\omega_I$).

The second antenna (H) 22 outputs a signal in which the transmission code (CC1), the sine wave (sin $\omega_P t$), and the carrier wave (cos $\omega_C t$) are superimposed (up-converted) on the information signal ($\omega_I$).

Further, in the first antenna (V) 21 and the second antenna (H) 22 which are spatially orthogonal with each other, a rotating polarized wave is created by radiating an electromagnetic wave including the cosine wave (cos $\omega_P t$) at the first antenna (V) 21 and radiating an electromagnetic wave including the sine wave (sin $\omega_P t$) at the second antenna (H) 22.

It is preferable that a ratio of the rotating frequency (angular frequency) $\omega_P$ of the rotating polarized wave to the propagation frequency (angular frequency) $\omega_C$, which is the carrier wave, is lower than 1/10.

Principle of Rotating Polarized Wave

A rotating principle is simply described below.

For example, there is a well-known equation as Euler's formula in the complex plane:

$$\exp(i\theta) = \cos\theta + i\cdot\sin\theta \qquad \text{Eq. (1)}$$

where i is an imaginary unit and $\theta$ is a rotation angle.

In Eq. (1), the vector defined by Eq. (1) moves on a circular circumference, drawing a circle (rotates) while $\theta$ varies. Further, cos $\theta$ represents a real number and $i\cdot\sin\theta$ represents an imaginary number. In other words, on the complex plane represented by an actual number axis and an imaginary number (i) axis, cos $\theta$ and $i\cdot\sin\theta$ move around the circular circumference, i.e., rotates as a vector.

The real number axis and the imaginary number (i) axis having the orthogonal relation corresponds to disposing, in spatially orthogonal directions, the first antenna (V) 21 and the second antenna (H) 22 which are transmission antennas according to the first embodiment of the present invention.

Further, cos θ on the right side of Eq. (1) corresponds, in the first embodiment, to radiation of polarized wave of the cosine wave (cos $\omega_P t$) as a magnetic wave from the first antenna (V) 21.

Further, i·sin θ on the right side of Eq. (1) corresponds, in the first embodiment, to radiation of polarized wave of the sine wave (sin $\omega_P t$) as a magnetic wave from the second antenna (H) 22.

More specifically, the first antenna (V) 21 and the second antenna (H) 22 are disposed spatially orthogonally each other and output electromagnetic waves into which electric signals of the cosine wave (cos $\omega_P t$) and the (sin $\omega_P t$) are converted, respectively. The electromagnetic waves are synthesized as an electromagnetic wave (radio wave) having rotating polarized wave circularly rotating in the space.

Configuration of a Receiver 301R

Next, configuration of the receiver 301R is described below.

The receiver 301R is configured including the first antenna (V) 21, the second antenna (H) 22, the circulators 23, 24, and solely includes a reception multipliers 32, 33, 35, 37, 43, 47 and a variable frequency local wave generator 31, a rotating polarized wave frequency cosine wave generator 34, a rotating polarized wave frequency sine wave generator 36, a reception adder 38, a first reception code generator (CC1) 41, a second reception code generator (CC2) 45, a first reception code circulator 42, a second circulator 46, the own device code demodulation result measurement circuit ($P_1$) 2, and the another device code demodulation result measurement circuit ($P_2$) 3.

As described above, the first antenna (V) 21, the second antenna (H) 22, and a receiver circulators 23, 24 are shared by the receiver 301R and the transmitter 301T.

The above-described configuration except the first antenna (V) 21 and the second antenna (H) 22, and the circulators 23, 24 is indicated as the receiving circuit of the receiver 301R.

Outline Functions of Configuration Elements in Receiver 301R

The reception multipliers 32, 33, 35, 43, 47 are used to superimpose two signals (down-converting, reverse spreading).

The variable frequency local wave generator 31 generates a frequency equivalent to the carrier wave (cos $\omega_C t$) of the variable frequency transmission carrier generator 17. The variable frequency local wave generator 31 is controlled by the baseband circuit 90 to control the frequency ($\omega_C$) of the carrier wave (cos $\omega_C t$).

The rotating polarized wave frequency cosine wave generator 34 generates the cosine wave (cos $\omega_P t$) which is the same as the rotating polarized wave frequency cosine wave generator 13 generates.

The rotating polarized wave frequency sine wave generator 36 generates a sine wave (sin $\omega_P t$) which is the same as the rotating polarized wave frequency sine wave generator 15 generates.

The reception adder 38 is used to add (synthesize) two signals.

The first reception code generator (CC1) 41 generates the code (specific code: CC1) equivalent to the code of the first transmission code generator (CC1) 11.

The second reception code generator (CC2) 45 generates a code (specific code: CC2) equivalent to the code generated by second reception code generators (CC2) 111, 141 included by the second wireless communication device 301b described later.

The code (CC1) and the code (CC2) are codes having an orthogonal relation with each other.

It is noted that "CC" in CC1 and CC2 is an abbreviation of "Correlation Code".

The code (CC1) generated by the first reception code generator (CC1) 41 and the first transmission code generator (CC1) 11 is the code assigned to an own device (the wireless communication device 301). The code (CC2) generated by the second reception code generator (CC2) 45 is a code assigned to another device (the second wireless communication device 301b) and mainly used to discriminate the signal from the own device (the wireless communication device 301) or the signal from the another device (the second wireless communication device 301b).

Further, the wireless communication device 301 and the second wireless communication device 301b previously share the code CC1 and the code CC2 each other to provide identification between own device and the another device.

The first reception code circulator 42 has a function of circulating the codes of the first reception code generator (CC1) 41 and the second reception code circulator 46 has a function of circulating the codes of the second reception code generator (CC2) 45.

The own device code demodulation result measurement circuit ($P_1$) 2 detects to what extent the code (CC1) of the own device is included in the received signal.

The another device code demodulation result measurement circuit ($P_2$) 3 detects to what extent the code of the another device (CC2) is included in the received signal.

Connection Configuration of Elements in Receiver 301R

The electromagnetic waves received by the first antenna (V) 21 and the second antenna (H) 22 are converted into electric signals, respectively.

The received signal from the first antenna (V) 21 is inputted into a first input of the reception multiplier 32 through a second port of the circulator 23.

The received signal from the second antenna (H) 22 is inputted into a first input of the reception multiplier 33 through a second port of the circulator 24.

The carrier wave (cos $\omega_C t$) of the variable frequency local wave generator 31 is inputted into a second input of the reception multiplier 32 which outputs a signal made by removing the carrier wave (cos $\omega_C t$) from the received signal, i.e., a down-converted signal.

The output signal of the reception multiplier 32 is inputted into a first input of a reception multiplier 35.

The cosine wave (cos $\omega_P t$) of the rotating polarized wave frequency cosine wave generator 34 is inputted into a second input of the reception multiplier 35. The reception multiplier 35 outputs a signal made by removing the cosine wave (cos $\omega_P t$) from the output signal of the reception multiplier 32, i.e., a down-converted signal.

The carrier wave (cos $\omega_C t$) of the variable frequency local wave generator 31 is inputted into a second input of the reception multiplier 33. The reception multiplier 33 outputs a signal made by removing the carrier wave (cos $\omega_C t$) from the received signal, i.e., a down-converted signal.

The output signal of the reception multiplier 33 is inputted into a first input of a reception multiplier 37.

The sine wave (sin $\omega_P t$) of the rotating polarized wave frequency sine wave generator 36 is inputted into a second input of the reception multiplier 37. The reception multiplier 37 outputs a signal made by removing the sine wave (sin $\omega_P t$) from the output signal of the reception multiplier 33, i.e., a down-converted signal.

An output of the reception multiplier 35 is inputted into a first input of the reception adder 38, and the output signal of a reception multiplier 37 is inputted into a second input of the reception adder 38.

The output signal of the reception multiplier 35 is a signal made by removing the carrier wave (cos $\omega_C t$) and the cosine wave (cos $\omega_P t$) from the signal received from the first antenna (V) 21.

The output signal of the reception multiplier 37 is a signal made by removing the carrier wave (cos $\omega_C t$) and the sine wave (sin $\omega_P t$) from the signal received from the second antenna (H) 22.

Accordingly, an output signal of the reception adder 38 is a signal resulting from synthesizing the signals received from the first antenna (V) 21 and the second antenna (H) 22 in which the carrier wave (cos $\omega_C t$), the cosine wave (cos $\omega_P t$), and the sine wave (sin $\omega_P t$) are removed.

The output signal of the reception adder 38 is divided into two.

One of the divided output signals is inputted into a first input of a reception multiplier 43.

Another of the divided output signals is inputted into a first input of a reception multiplier 47.

A code at an output of the first reception code generator (CC1) 41 is inputted into the first reception code circulator 42. An output signal of the first reception code circulator 42 is inputted into a second input of the reception multiplier 43.

As described above, the first input of the reception multiplier 43 receives the output signal of the reception adder 38.

Multiplication is made with the reception multiplier 43 to have a maximum value in a correlation calculation result through circulation of the output signal of the first reception code generator (CC1) 41 with control of the first reception code circulator 42.

The correlation calculation result is a calculation result of to what extent the transmission code (specific code: CC1) from the transmission side in the received signal inputted from the first antenna (V) 21 and the second antenna (H) 22 and a reception code (specific code: CC1) of the first reception code generator (CC1) 41 are correlated (agreed).

Though the transmission code (CC1) is included in the received signal, it is not easy to detect the transmission code (CC1) because of time delay due to propagation, reflection by shielding member, etc on the way of propagation. Accordingly, it is tried to calculate to detect correlation (agreement) through circulating the code (specific code: CC1) generated by the first reception code generator (CC1) 41 using the first reception code circulator 42.

Further, this operation functions also as inverse spreading the received signal with the code (specific code: CC1) using the first reception code generator (CC1) 41, the first reception code circulator 42, and the reception multiplier 43.

An output signal (demodulation signal) of the reception multiplier 43 is inputted into the own device code demodulation result measurement circuit ($P_1$) 2.

The own device code demodulation result measurement circuit ($P_1$) 2 detects to what extent the received signal includes the code (specific code: CC1) of own device.

The code outputted by the second reception code generator (CC2) 45 is inputted into the second circulator 46. An output signal of the second circulator 46 is inputted into a second input of the reception multiplier 47.

As described above, the output signal of the reception adder 38 is inputted into the first input of the reception multiplier 47.

Multiplication is made with the reception multiplier 47 to have a maximum value in a correlation calculation result through circulation of the output signal of the second reception code generator (CC2) 45 with control of the second code circulator 46.

The correlation calculation result is a calculation result of to what extent the transmission code (specific code: CC2) from the transmission side in the received signal inputted from the first antenna (V) 21 and the second antenna (H) 22 and a reception code (specific code: CC2) of the second reception code generator (CC2) 45 are correlated (agreed).

Though the transmission code (CC2) is included in the received signal, it is not easy to detect the transmission code (CC2) because of time delay due to propagation, reflection by shielding member, etc. on the way of propagation. Accordingly, it is tried to calculate to detect correlation (agreement) through circulating the code (specific code: CC2) generated by the second reception code generator (CC2) 45.

Further, this operation functions also as inverse spreading the received signal with the code (specific code: CC2) using the second reception code generator (CC2) 45, the second code circulator 46, and the reception multiplier 47.

An output signal (demodulation signal) of the reception multiplier 47 is inputted into the another device code demodulation result measurement circuit 3.

The another device code demodulation result measurement circuit (P2) 3 detects to what extent the received signal includes the code (specific code: CC2) of the another device.

As described above, the baseband circuit 90 includes the information signal generator ($\omega_I$) 1, the own device code demodulation result measurement circuit 2 used for reception, and the another device code demodulation result measurement circuit 3 which exchange data (signals) relating the control each other.

Second Wireless Communication Device 301b

Next, the second wireless communication device 301b for wireless communication with the wireless communication device 301 is described below.

Configuration of the second wireless communication device 301b shown in FIG. 1 is basically the same as that of the wireless communication device 301.

More specifically, a transmitter 301Tb, a receiver 301Rb, a first antenna (V) 121, a second antenna (H) 122, circulators 123, 124, and a baseband circuit (BB) 190 in the second wireless communication device 301b basically correspond to the transmitter 301T, the receiver 301R, the first antenna (V) 21, the second antenna (H) 22, the circulators 23, 24, and the baseband circuit (BB) 90 in the wireless communication device 301, respectively.

Further, an information signal generator ($\omega_I$) 101, transmission multipliers 112, 114, 118, 119, a rotating polarized wave frequency cosine wave generator 113, a rotating polarized wave frequency sine wave generator 115, a variable frequency transmission carrier generator 117, which form a transmitting circuit of the transmitter 301Tb in the second wireless communication device 301b, correspond to the information signal generator ($\omega_I$) 1, the transmission multipliers 12, 14, 16, 18, 19, the rotating polarized wave frequency cosine wave generator 13, the rotating polarized wave frequency sine wave generator 15, and the variable frequency transmission carrier generator 17, which form the transmitter 301T in the wireless communication device 301, respectively.

Further, reception multipliers 132, 133, 135, 137, 143, 147, a variable frequency local wave generator 131, a rotating polarized wave frequency cosine wave generator 134, a rotating polarized wave frequency sine wave generator 136, a reception adder 138, a first code circulator 142, a second code circulator 146, an own device code demodulation result measurement circuit 102, the another device code demodulation result measurement circuit 103, which form a receiving circuit of the receiver 301Rb in the second wireless communication device 301b, corresponds to the reception multipliers 32, 33, 35, 37, 43, 47, the variable frequency local wave generator 31, the rotating polarized wave frequency cosine wave generator 34, the rotating polarized wave frequency sine wave generator 36, the reception adder 38, the first reception code circulator 42, the second code circulator 46, the own device code demodulation result measurement circuit ($P_1$) 2, the another device code demodulation result measurement circuit ($P_2$) 3, which form a receiving circuit in the receiver 301R of the wireless communication device 301, respectively.

However, in the second wireless communication device 301b, there is a difference from the configuration of the wireless communication device 301 in the second reception code generator (CC2) 111 in the transmitter 301Tb and a first reception code generator (CC1) 145 in the receiver 301Rb.

More specifically, the second reception code generator (CC2) 111 in the transmitter 301Tb of the second wireless communication device 301b replaces the first transmission code generator (CC1) 11 in the transmitter 301T of the wireless communication device 301.

Further, the second reception code generator (CC2) 141 in the transmitter 301Rb replaces the first reception code generator (CC1) 41 and the second reception code generator (CC2) 45 in the transmitter 301R.

This is because the code CC1 is assigned as the code for identifying the first wireless communication device 301 and the code CC2 is assigned as the code for identifying the second wireless communication device 301b.

In other words, the second wireless communication device 301b has the same configuration as the wireless communication device 301 basically. However, to identify own device by the second wireless communication device 301b or to cause another device to identify the device, a change is made in the second reception code generator (CC2) 111 in the transmitter 301Tb of the second wireless communication device 301b to generation of the second code CC2 in place of the first code CC1 in the first transmission code generator (CC1) 11 of the transmitter 301T of the first wireless communication device 301.

Further, to identify the code CC2, a change is made to generation of the second code 2 in a second reception code generator (CC2) 141 of the receiver 301Rb because the code assigned to own device (the second wireless communication device 301b) in the own device code demodulation result measurement circuit ($P_1$) 102 of the receiver 301Rb in the second wireless communication device 301b is the code CC2.

Further, to identify the code CC1 of the another device, a change is made to generation of the first code CC1 in a first reception code generator (CC1) 145 of the receiver 301Rb because the code assigned to the another device (the first wireless communication device 301) is the code CC1 for the another device code demodulation result measurement circuit 103 of the receiver 301Rb in the second wireless communication device 301b. Wireless communication between wireless communication device 301 and second wireless communication device 301b An operation of the wireless communication system for performing wireless communication through the shield member (material) 99 by the wireless communication device 301 and the second wireless communication device 301b in FIG. 1 is described below.

Outline of Wireless Communication Between First and Second Wireless Communication Devices Through Shielding Member Outline, concept, and background, etc of wireless communication between the first wireless communication device and the second wireless communication device through the shielding member are described below.

When an electromagnetic wave transmitting through the space is incident to the material (for example the shield member 99 shown in FIG. 1) having a loss, a part of the electromagnetic wave incident to the material transmits through the material and a remaining part is spatially reflected in accordance with a difference in the number of waves in the space and the number of the wave in the material.

Generally, when there are large differences between the space and the material in the dielectric constant and the magnetic permeability, a ratio of the electromagnetic energy (electromagnetic energy) transmitting the medium becomes small, the energy of the electromagnetic energy reaching the opposite side after transmitting the material is largely attenuated.

Though realization of the communication through the medium is desired, it is difficult to provide the communication when there is a large difference between the dielectric constant and the permeability of the material and the space.

It is known that there is a special condition in an incident angle such that an electromagnetic wave is not reflected by the interface plane when the electromagnetic wave is incident to the interface plane whose both sides have largely different dielectric constants and the magnetic permeabilities. The angle is referred to as Brewster's angle.

The condition occurring the Brewster's angle corresponds to that the polarized wave of the electromagnetic wave (vibration direction) is parallel to the interface of the medium. The Brewster's angle is defined by the total number of the number of waves of the materials pinching the interface.

When generation of the polarized wave satisfying the condition is kept and the polarized wave is incident at the Brewster's angle, all the electromagnetic energy incident to the material enters the material. The electromagnetic wave transmits in the material while the electromagnetic energy is being lost gradually, and passes therethrough and is radiated at the opposite end toward the space again when the material has a limited value.

Since the Brewster's angle is uniquely determined by constitutive parameters of the two materials forming the interface, to cause the electromagnetic wave to enter the material, it is necessary to control the incident angle to the interface and a polarizing direction at the same instance.

Use of an electromagnetic wave of which polarized wave, called rotating polarized wave, rotates at a rotating frequency different from the propagation frequency enables control of the angle of the polarized wave on a time axis with a general purpose commercial digital signal processing device by making the rotating frequency of the polarized wave sufficiently lower than the propagation frequency.

When the material has a loss, the dielectric constant is a complex number. Since the imaginary part varies at an inverse of the frequency, changing the propagation frequency of the electromagnetic frequency can change the constitutive parameter which determines the Brewster's angle. This can change the value of the Brewster's angle, which can change the angle to cause the electromagnetic wave efficiently enter the material.

To provide communication between both sides of the material, wireless communication devices (for example, the wireless communication device 301 and the second wireless communication device 301b in FIG. 1) capable of communication using rotating polarized wave of which carrier frequency can be changed are installed on both sides of the material. Different codes are assigned to these wireless communication devices (for example, CC1, CC2), and both the wireless communication devices share these codes.

Each of the wireless communication devices separated by the material spreads the information signal with the specific code for own device (specific code) and transmits the spread information signal. The wireless communication device demodulates a received signal with its own code (for example the code CC1) and the code of the another device (for example, the code CC2) and measures an intensity ratio or a communication quality ratio therebetween.

A propagation wave frequency and a polarized wave (rotating polarized wave) for both the wireless communication devices can be obtained by controlling both the carrier wave frequency ($\omega_C$) and the polarizing direction of the rotating polarized wave (synthesizing with cos $\omega_P t$, sin $\omega_P t$) at the same time so as to make the demodulation result with it's own code (specific code) is smaller than the demodulation result with the code of the another device (specific code).

Use of the obtained optimal carrier wave frequency and the polarized wave direction provides a favorable wireless communication on both sides of the material.

Since the control of the carrier wave frequency and the polarized wave direction is performed electrically, though the state of the material or a change in a relative position of the material occurs, a preferable wireless communication can be made again even in the circumference after the variation by repeating this operation to obtain the optimal carrier frequency and the polarized wave direction.

Operation in the Circuit Configuration

In the transmitter 301T, the information signal ($\omega_I$) generated by the information signal generator ($\omega_I$) 1 is spread by the first transmission code (CC1), after that, the cosine wave cos $\omega_P t$ of the rotating polarized wave frequency and the carrier wave cos $\omega_C t$ are superimposed on the information signal and the up-converted signal is radiated by the first antenna (V) 21 as an electromagnetic wave through a first pass including the transmission multiplier 14, the transmission multiplier 18, and the circulator 23.

The information signal ($\omega_I$) spread by the first transmission code (CC1) undergone superimposition of the sine wave of the rotating polarized wave frequency sin $\omega_P t$ and the carrier wave cos $\omega_C t$ thereon, and the up-converted signal is radiated by the second antenna (H) 22 as an electromagnetic wave in a second path including the transmission multiplier 16, the transmission multiplier 19, and the circulator 24.

As described above, the first antenna (V) 21 and the second antenna (H) 22 are spatially orthogonal with each other, rotating polarized wave is generated by the cos $\omega_P t$ and sin $\omega_P t$, and the information signal ($\omega_I$) is up-converted by cos $\omega_C t$, which is the carrier wave is spatially radiated as the electromagnetic wave.

The electromagnetic wave in which the rotating polarized wave ($\omega p$) and the carrier wave ($\omega_C$) are superimposed on the information signal ($\omega_I$) transmits the shield member 99 and reach the second wireless communication device 301b.

Further, the electromagnetic wave is attenuated during transmission though the shield member 99.

Further, a part of the electromagnetic wave is reflected without transmission.

In the second wireless communication device 301b, reception is made by the first antenna 121 and the second antenna 122 using the receiver 301Rb to obtain the information signal ($\omega_I$). The information signal ($\omega_I$) is shared in the baseband circuit 190.

In the transmitter 301Tb, the information signal ($\omega_I$) is transmitted by the information signal generator ($\omega_I$) 101 using the first antenna 121 and the second antenna 122 as an electromagnetic wave.

An information signal ($\omega_I$) in the transmitter 301Tb is spread by the second transmission code (CC2) and transmitted on the rotating polarized wave ($\omega p$) and the carrier wave ($\omega_C$) as an electromagnetic wave.

Detailed descriptions of reception and transmission in the second wireless communication device 301b are the same as the description in the wireless communication device 301, and a duplication description is omitted.

The electromagnetic wave in which the information signal ($\omega_I$) of the second wireless communication device 301b is superimposed on the rotating polarized wave ($\omega p$) and the carrier wave ($\omega_C$) transmits the shield member 99 and reaches the wireless communication device 301.

The electromagnetic wave is attenuated during transmission through the shield member 99.

A part of the electromagnetic wave is reflected by the shield member 99 without transmission.

The wireless communication device 301 receives, by the first antenna (V) 21 and the second antenna (H) 22, the electromagnetic wave in which the information signal ($\omega_I$) is superimposed on the rotating polarized wave and the carrier wave ($\omega_C$).

However, the electromagnetic wave received by the first antenna (V) 21 and the second antenna (H) 22 includes in a mixed manner the electromagnetic wave transmitted through the shield member 99 from the second wireless communication device 301b and the electromagnetic wave emitted by the wireless communication device 301 and reflected by the shield member 99.

On the other hand, in the electromagnetic wave radiated by the second wireless communication device 301b and transmitted through the shield member 99, the second code (CC2) (spread by the second code (CC2) is superimposed (spread).

In the electromagnetic wave radiated by the first wireless communication device 301 and reflected by the shield member 99 and returned, the first code (CC1) is superimposed thereon (spread by the first code (CC1).

Accordingly, the electromagnetic wave received by the first antenna (V) 21 and the second antenna (H) 22 includes the signal from the second wireless communication device 301b and the signal from the wireless communication device 301 in a mixed manner. However, these signals can be discriminated therebetween using the presence or absence of the first code (CC1) and the second code (CC2).

The signal received by the first antenna (V) 21 of the wireless communication device 301 is supplied through the second port of the circulator 23 to the reception multiplier 32 which removes the carrier wave ($\omega_C$) and removes the component of (cos $\omega_P t$) of the rotating polarized wave ($\omega p$) by the reception multiplier 35.

The signal received by the second antenna (H) 22 of the first wireless communication device 301 is supplied through the second port of the circulator 24 to the reception multiplier 33 which removes the carrier wave ($\omega_C$) and removes the component of (sin $\omega_p t$) of the rotating polarized wave ($\omega p$) by the reception multiplier 37.

The reception adder 38 synthesizes the output signal of the reception multiplier 35 and the output signal of the reception multiplier 37. In other words, the signals inputted from the first antenna (V) 21 and the second antenna (H) 22, respectively, are down-converted and synthesized by the reception adder 38.

An output of the reception adder 38 is divided into two. One of the divided signals is inputted into the first input and another of the divided signals is inputted into the first input of the reception multiplier 47.

The signal inputted into the reception multiplier 43 is calculated so that the correlated calculation result with the first code (CC1) becomes maximum using the first reception code generator (CC1) 41 and the first reception code circulator 42.

Next, the own device code demodulation result measurement circuit ($P_1$) 2 measures to what extent the received signal includes outputted by its own device, i.e., outputted by the wireless communication device 301. The measurement result corresponds to measuring a component (in signal intensity) of the electromagnetic wave outputted by the wireless communication device 301 and is reflected by the shield member 99.

The signal inputted into the reception multiplier 47 is calculated so that the correlation calculation result with the second code (CC2) becomes maximum using the second reception code generator (CC2) 45 and the second reception code circulator 46.

Next, the another device code demodulation result measurement circuit 3 measures to what extent the received signal includes the signal outputted by the another device, i.e., outputted by the second wireless communication device 301b. The measurement result corresponds to measuring a component (in signal intensity) of the electromagnetic wave outputted by the second wireless communication device 301b and is reflected by the shield member 99.

Using the measurement result of the own device code demodulation result measurement circuit 2 and the another device code demodulation result measurement circuit 3, the baseband circuit (BB) 90 can know electric power corresponding to a ratio of the electromagnetic wave energy of the signal coming from the another device transmitted through the material (the shield member 99) to the signal coming from the own device (the wireless communication device 301) and the electromagnetic wave energy which cannot enter the material (the shield member 99).

The frequency ($\omega_C$) in the variable frequency transmission carrier generator 17 and the frequency of the variable frequency local wave generator (cos $\omega_C t$) 31 are controlled by a digital circuit (not shown) included in the baseband circuit 90.

The reception multiplier 43, the first reception code circulator 42 and the reception multiplier 47 and the second code circulator 46 integrally calculate a shift in the polarized wave angle of the reception rotating polarized wave relative to the transmission rotating polarized wave by control of the baseband circuit 90.

The calculations described above are carried out by the wireless communication device 301 and the second wireless communication device 301b while the wireless communication device 301 and the second wireless communication device 301b changes the frequency ($\omega_C$) of the carrier waves (cos $\omega_C t$) of the variable frequency transmission carrier generator 17 and the variable frequency transmission carrier generator 117 within a variable range.

A value of the frequency ($\omega_C$) is searched, the value provides the maximum ratio of the signal intensity of the demodulation signal by the specific code by the another device measured by the another device code demodulation result measurement circuit 3 (103) to the signal intensity of the demodulated signal by the specific doe of own device measured by the own device code demodulation result measurement circuit 2 (102).

Further after measurement and calculation are performed over the variable range of the carrier signal ($\omega_C$), the wireless communication is performed in which the searched carrier wave frequency ($\omega_C$) providing the maximum ratio of the signal intensity is fixed.

The signal intensity of the demodulation signal by the specific code of the another device becomes maximum relative to the signal intensity of the demodulation signal by the specific code of own device, which means that the signal intensity of the electromagnetic wave outputted by the another device and transmitted through the shield member 99 and reaching the own device is strongest relative to the signal intensity the electromagnetic wave outputted by the own device, reflected by the shield member 99, and returned to the own device.

More specifically, this provides the carrier frequency which can make an influence by the shield member 99 smallest in the wireless communication between the own device and the another device and corresponds to the most preferable state.

Both the wireless communication devices (the wireless communication device 301 and the second wireless communication device 301b) repeat the calculations and perform wireless communication and calculation each time, so that convergence occurs rapidly.

As described above, the carrier frequencies ($\omega_C$) and polarized waves (rotating polarized waves) which are optimal for use by both the wireless communication devices (the wireless communication device 301 and the second wireless communication device 301b) can be obtained to perform the wireless communication through a material (the shield member 99), respectively.

In addition, though the transmission paths become not optimal due to change in circumference, it is possible to obtain optimal carrier frequencies ($\omega_C$) and optimal polarized waves (rotating polarized waves) in the new circumference by repeating these calculations by both the wireless communication devices (the wireless communication device 301 and the second wireless communication device 301b), perform wireless communication and calculation, respectively.

Advantageous Effect According to First Embodiment

According to the first embodiment, the use of the calculated optimal carrier frequencies ($\omega_C$) and the polarization direction provides preferable wireless communication on both sides of the material (the shield member 99) having a loss.

Since the control of the carrier frequencies and polarization directions is electrically performed, a preferable wireless communication can be provided again with new optimal carrier frequencies and new optimal polarization directions by repeating the process of obtaining the optimal carrier frequencies and the optimal polarization directions.

Second Embodiment

In the second embodiment, an example of the wireless communication system for wireless communication by transmission of electromagnetic waves through the material of the shield member is described below with reference to FIG. 2.

Figure 2:
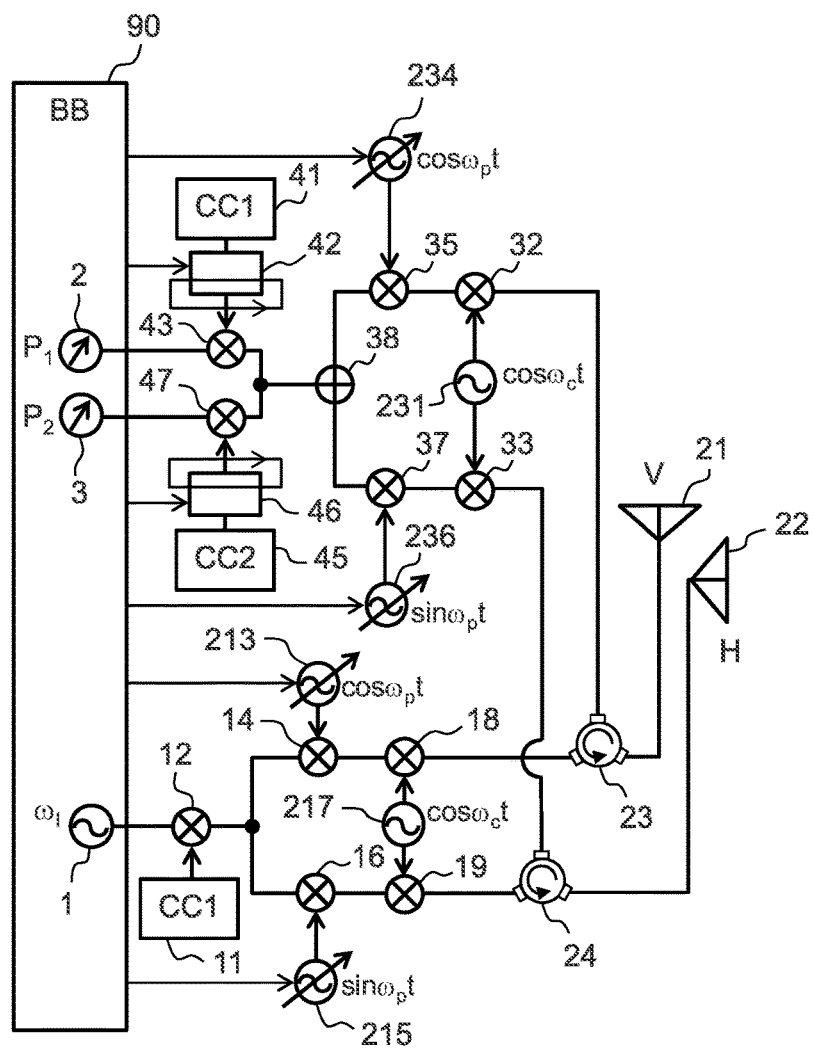
FIG. 2 is a block diagram of a wireless communication system according to a second embodiment of the present invention.

FIG. 2 shows an example of the wireless communication system according to the second embodiment of the present invention. However, only a first wireless communication device 302 is shown, and descriptions of the second wireless communication device 301b and the shield member (material) 99 shown in FIG. 1 are omitted.

In FIG. 2, differences in configuration of the first wireless communication device 302 from the wireless communication device 301 shown in FIG. 1 is in a variable frequency rotating polarized wave frequency cosine wave generator 213, 234, variable frequency rotating polarized wave frequency sine wave generators (sin $\omega_F t$) 215, 236, local wave generators (cos $\omega_C t$) 217, 231.

In the wireless communication device 301 in FIG. 1, the rotating polarized wave frequency cosine wave generators (cos $\omega_F t$) 13, 34, the rotating polarized wave frequency sine wave generators (sin $\omega_F t$) 15, 36 are not controlled by the baseband circuit (BB) 90.

Centrally to this, the first wireless communication device 302 shown in FIG. 2, the variable frequency rotating polarized wave frequency cosine wave generators (cos $\omega_F t$) 213, 234, the variable frequency rotating polarized wave frequency sine wave generators (sin $\omega_F t$) 215, 236 become controlled by the baseband circuit (BB) 90.

Further, in a wireless communication device 301 shown in FIG. 1, a variable frequency transmission carrier generator 17, and 31 are controlled by the baseband circuit 90.

Centrally to this, in the first wireless communication device 02 shown in FIG. 2, the local wave generators (cos $\omega_C t$) 217, 231 become not controlled in frequency by the baseband circuit (BB) 90.

Other configuration in FIG. 2 is the same as the configuration in FIG. 1, and duplication descriptions are omitted.

The electromagnetic waves radiated by the first antenna (V) 21 and the second antenna (H) 22 include both components of the carrier waves (cos $\omega_C t$) and the rotating polarized waves (cos $\omega_F t$, sin $\omega_F t$). Accordingly, optimization is possible by adjusting the rotating polarized waves (cos $\omega_C t$, sin $\omega_F t$) in place of adjusting the carrier wave (cos $\omega_C t$).

In the first embodiment, the optimizing method is provided by adjusting the carrier waves (cos $\omega_C t$). On the other hand, in the second embodiment, the optimizing method is provided by adjusting the rotating polarized waves (cos $\omega_F t$, sin $\omega_F t$).

It is possible to provide a preferable wireless communication at both sides of the material having loss (the shield member 99, see FIG. 1) by using the frequency and the polarization direction of the optimal rotating polarized waves (cos $\omega_F t$, sin $\omega_F t$) which are also obtained in the second embodiment shown in FIG. 2.

Advantageous Effect According to Second Embodiment

According to the second embodiment shown in FIG. 2, the frequency band region of changing the frequency can be made lower than that in the first embodiment shown in FIG. 1, which can enhance accuracy in changing the frequency of the carrier frequency.

Third Embodiment

In the third embodiment, an example of the wireless communication system for wireless communication by transmission of electromagnetic waves through the material of the shield member is described below with reference to FIG. 3.

Figure 3:
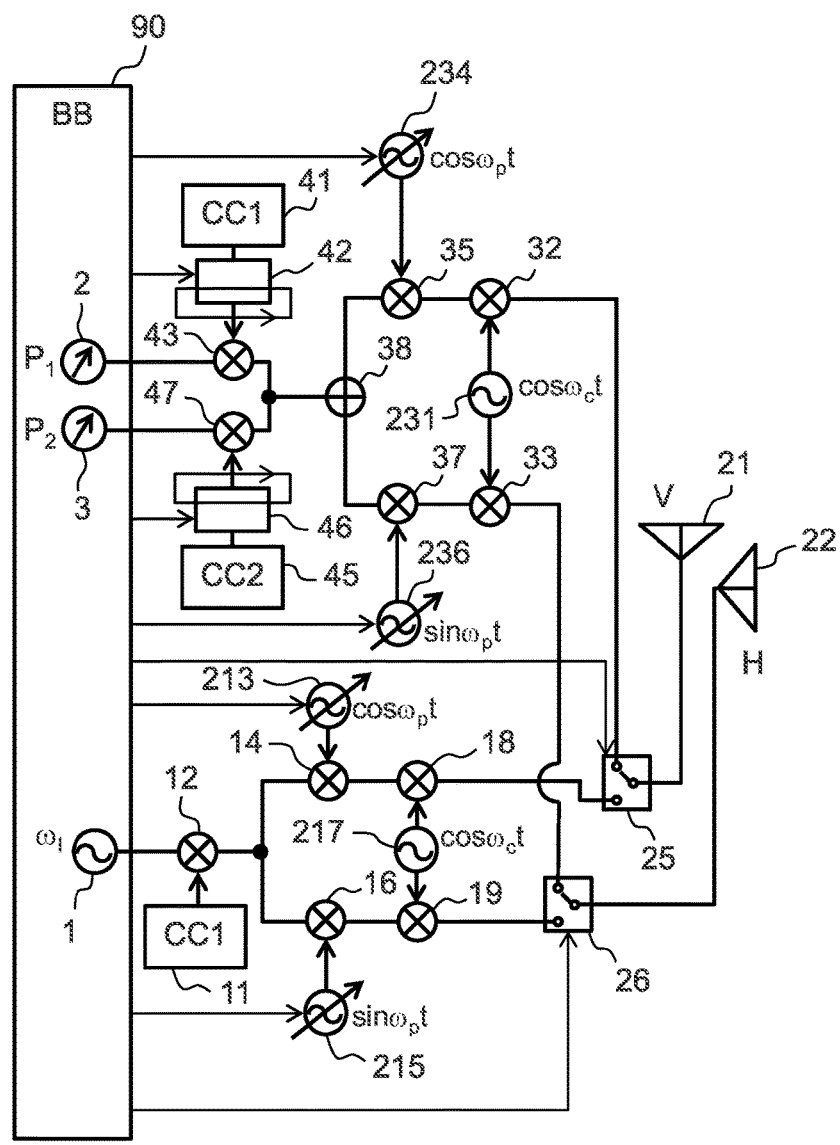
FIG. 3 is a block diagram of a wireless communication system according to a third embodiment of the present invention.

FIG. 3 shows an example of the wireless communication system according to the third embodiment of the present invention. However, only a first wireless communication device 303 is shown, and descriptions of the second wireless communication device 301b and the shield member (material) 99 shown in FIG. 1 are omitted.

In FIG. 3, difference in configuration of the first wireless communication device 303 from the wireless communication device 302 shown in FIG. 2 is in that antenna switching devices 25, 26 are provided, which place the circulators 23, 24 in FIG. 2.

Switching operations of the antenna switching devices 25, 26 are controlled by the baseband circuit (BB) 90.

The antenna switching devices 25, 26 have functions of sharing the first antenna (V) 21 and the second antenna (H) 22 to have transmission antenna operations and reception antenna operations similar to the circulators 23, 24 shown in FIG. 2.

Other configuration in FIG. 3 is the same as the configuration in FIG. 2, and duplication descriptions are omitted.

Advantageous Effect According to Third Embodiment

According to the third embodiment shown in FIG. 3, the antenna switching devices 25, 26 place the circulators 23, 24 in FIG. 2.

This provides size reduction in the device and cost reduction because the circulator is large and expensive which are replaced with the switching devices, which are semiconductor devices having a small size and a low cost.

Fourth Embodiment

In the fourth embodiment of the present invention, an example of the wireless communication system for wireless communication by transmission of electromagnetic waves through the material of the shield member is described below with reference to FIG. 4.

Figure 4:
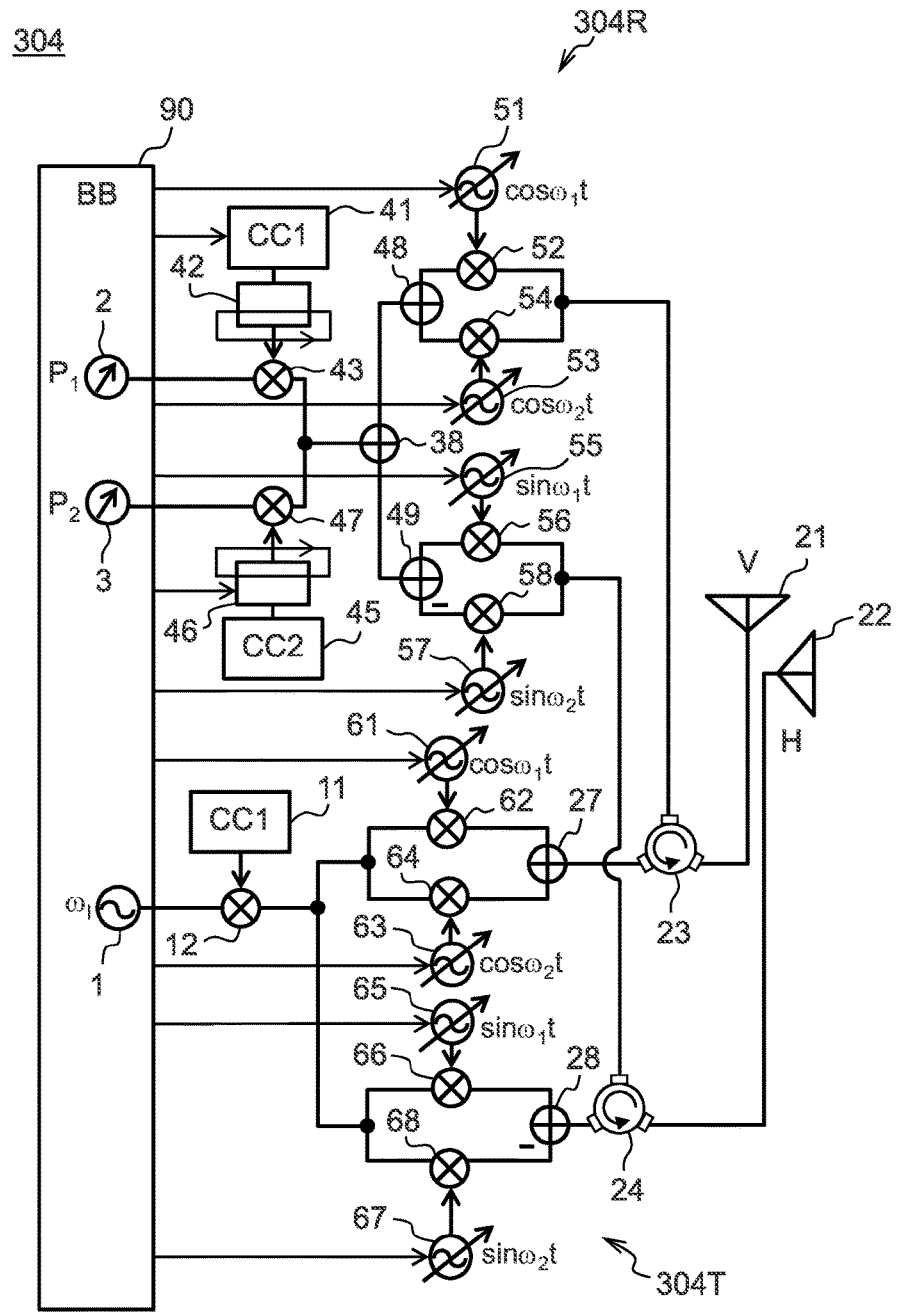
FIG. 4 is a block diagram of a wireless communication system according to a fourth embodiment of the present invention.

FIG. 4 shows an example of the wireless communication system according to the third embodiment of the parent invention. However, only a first wireless communication device 304 is shown in FIG. 4, and descriptions of the second wireless communication device 301b and the shield member (material) 99 shown in FIG. 1 are omitted.

Wireless Communication Device 304

In FIG. 4, a wireless communication device 304 is configured including a transmitter 304T, a receiver 304R, the first antenna (V) 21, the second antenna (H) 22, the circulators 23, 24, and the baseband circuit 90.

The circulators 23, 24 have functions of sharing the first antenna (V) 21 and the second antenna (H) 22 to have transmission antenna operations and reception antenna operations. Further, the baseband circuit 90 includes the information signal generator ($\omega_I$) 1 used for transmitting, the own device code demodulation result measurement circuit 2, and the another device code demodulation result measurement circuit 3 used for receiving.

Configuration of Transmitter 304T

The transmitter 304T includes the information signal generator ($\omega_I$) 1, the first transmission code generator (CC1) 11, the transmission multipliers 12, 62, 64, 66, 68, a variable frequency first frequency cosine carrier wave generator (cos $\omega_1 t$) 61, a variable frequency second frequency cosine carrier wave generator (cos $\omega_2 t$) 63, a variable frequency first frequency sine carrier wave generator (sin $\omega_1 t$) 65, the variable frequency second frequency sine carrier wave generator (sin $\omega_2 t$) 67, the transmission adder 27, the transmission subtractor 28, and as transmission antennas, the first antenna (V) 21 and the second antenna (H) 22.

As described above, the first antenna (V) 21 and the second antenna (H) 22 are used as transition antennas 21 and 22 by switching functions of the circulators 23, 24.

Outline Functions of Elements in Transmitter 304T

The information signal generator ($\omega_I$) 1, the transmission multipliers 12, 62, 64, 66, 68, the first transmission code generator (CC1) 11, the circulators 23, 24, the first antenna (V) 21, and the second antenna (H) 22 are the same as those in FIG. 1, and duplication descriptions are omitted.

The variable frequency first frequency cosine carrier wave generator 61 generates a carrier wave (cos $\omega_1 t$) at a first frequency.

The variable frequency second frequency cosine carrier wave generator (cos $\omega_2 t$) 63 generates a cosine carrier wave (cos $\omega_2 t$) as a second frequency.

The variable frequency first frequency sine carrier wave generator (sin $\omega_1 t$) 65 generates the frequency sine carrier wave (sin $\omega_1 t$) at the first frequency.

A variable frequency second frequency sine carrier wave generator (sin $\omega_2 t$) 67 generates a variable frequency second frequency sine carrier wave (sin $\omega_2 t$) at a second frequency.

The frequencies of the variable frequency first frequency cosine carrier wave generator 61, the variable frequency second frequency cosine carrier wave generator (cos $\omega_2 t$) 63, the variable frequency first frequency sine carrier wave generator (sin $\omega_1 t$) 65, and the variable frequency second frequency sine carrier wave generator (sin $\omega_2 t$) 67, are controlled by the baseband circuit 90.

A transmission subtractor 28 performs subtraction to obtain a difference between two input signals thereto.

Connection Configuration of Elements in Transmitter 304T

The connection configuration of the information signal generator ($\omega_I$) 1, the transmission multiplier 12, and the first transmission code generator (CC1) 11 are omitted to avoid duplication description of the description regarding FIG. 1.

An output signal of the transmission multiplier 12 is divided into two output signals.

One of the divided output signals is inputted into first inputs of a transmission multiplier 62 and a transmission multiplier 64.

The other of the divided output signal is inputted to first inputs of a transmission multiplier 66 and a transmission multiplier 68.

A first frequency cosine carrier wave (cos $\omega_1 t$) of the variable frequency first frequency cosine carrier wave generator 61 is inputted to a second input of the transmission multiplier 62 to superimpose (modulate) the first frequency cosine carrier wave (cos $\omega_1 t$) on the output signal of the transmission multiplier 12.

A second frequency cosine wave (cos $\omega_2 t$) of the variable frequency second frequency cosine carrier wave generator 63 is inputted into a second input of the transmission multiplier 64 to superimpose (modulate) the second frequency cosine wave (cos $\omega_2 t$) on the output signal of the transmission multiplier 12.

A first frequency sine wave (sin $\omega_1 t$) of the variable frequency first frequency sine carrier wave generator 65 is inputted to a second input of the transmission multiplier 66 to superimpose (modulate) the first frequency sine wave (sin $\omega_1 t$) on the output signal of the transmission multiplier 12.

A second frequency sine wave (sin $\omega_2 t$) of the variable frequency second frequency sine carrier wave generator 67 is inputted into a second input of the transmission multiplier 68 to superimpose (modulate) the second frequency sine wave (sin $\omega_2 t$) on the output signal of the transmission multiplier 12.

An output signal of a transmission multiplier 62 is inputted into a first input of a transmission adder 27.

The output signal of the transmission multiplier 64 is inputted into a second input of the transmission adder 27.

The transmission adder 27 adds (synthesizes) the output signal of the transmission multiplier 62 and the output of the transmission multiplier 64.

An output signal of the transmission adder 27 is inputted into a first port of the circulator 23.

An output signal of the transmission multiplier 66 is inputted into a first input of the transmission subtractor 28.

An output signal of the transmission multiplier 68 is inputted into a second input of the transmission subtractor 28.

The transmission subtractor 28 subtracts the output signal of the transmission multiplier 68 from the output signal of the transmission multiplier 66 to obtain a difference.

An output signal of the transmission subtractor 28 is inputted into a first port of the circulator 24.

Further, the transmission subtractor 28 obtains a difference between the output signal of the transmission multiplier 66 including a component of first frequency sine wave (sin $\omega_1 t$) and the output signal of the transmission multiplier 68 including a component of the second frequency sine wave (sin $\omega_2 t$). This intends to cause the rotating polarized waves of the frequency ($\omega_1$) and the rotating polarized wave of the frequency ($\omega_2$) to generate two rerating polarized waves rotating in opposite directions, for example, counterclockwise and clockwise.

The process of radiating the electromagnetic wave from the circulator 23 through the first antenna (V) 21 and the process of radiating the electromagnetic wave from the circulator 24 through the second antenna (H) 22 are omitted because of duplication descriptions.

Configuration of Receiver 304R

Configuration of the receiver 304R is described below.

The receiver 304R includes the first antenna (V) 21, the second antenna (H) 22, the circulators 23, 24, the reception multipliers 43, 47, 52, 54, 56, 58, a variable frequency first frequency cosine local wave generator (cos $\omega_1 t$) 51, a variable frequency second frequency cosine local wave generator (cos $\omega_2 t$) 53, a variable frequency first frequency sine local wave generator (sin $\omega_1 t$) 55, a variable frequency second frequency sine local wave generator (sin $\omega_2 t$) 57, the reception adders 38, 48, a reception subtractor 49, the first reception code generator (CC1) 41, the second reception code generator (CC2) 45, the first reception code circulator 42, the second code circulator 46, the own device code demodulation result measurement circuit ($P_1$) 2, and the another device code demodulation result measurement circuit ($P_2$) 3.

As described above, the first antenna (V) 21, the second antenna (H) 22, the circulators 23, 24 are used for the receiver 304R and the transmitter 304T.

In the above-described configuration, the configuration other than the first antenna (V) 21, the second antenna (H) 22, the circulators 23, 24 are designated as receiving circuits of the receiver 304R occasionally.

Outline Functions of Components of Receiver 304R

The functions of the first antenna (V) 21, the second antenna (H) 22, the circulators 23, 24, the reception multipliers 43, 47, 52, 54, 56, 58, the reception adders 38, 48, the first reception code generator (CC1) 41, the second reception code generator (CC2) 45, the first reception code circulator 42, the second code circulator 46, the own device code demodulation result measurement circuit ($P_1$) 2, and the another device code demodulation result measurement circuit ($P_2$) 3 have been described with reference to FIG. 1, and duplication descriptions are omitted.

The variable frequency first frequency cosine local wave generator (cos $\omega_1 t$) 51 generates a cosine carrier wave (cos $\omega_1 t$) at the first frequency.

The variable frequency second frequency cosine local wave generator (cos $\omega_2 t$) 53 generates a cosine carrier wave (cos $\omega_2 t$) at the second frequency.

The variable frequency first frequency sine local wave generator (sin $\omega_1 t$) 55 generates at a first frequency a sine carrier wave (sin $\omega_1 t$).

The variable frequency second frequency sine local wave generator (sin $\omega_2 t$) 57 generates a sine local carrier wave (sin $\omega_2 t$) at the second frequency. Frequencies generated by the variable frequency first frequency cosine local wave generator (cos $\omega_1 t$) 51, the variable frequency second frequency cosine local wave generator (cos $\omega_2 t$) 53, the variable frequency first frequency sine local wave generator (sin $\omega_1 t$) 55, and the variable frequency second frequency sine local wave generator (sin $\omega_2 t$) 57 are controlled to generate a frequency controlled by the baseband circuit 90.

The reception subtractor 49 performs subtraction to have a difference between two signals.

Connection Configuration of Elements in Receiver 304R

Connection relations of the first antenna (V) 21, the second antenna (H) 22, and the circulators 23, 24 have been described with reference to FIG. 1, and duplication descriptions are omitted.

The signal inputted in to the circulator 23 at the second port is divided into two signals. One of the divided signal is inputted into a first input of the reception multiplier 52. The other divided signal is inputted into a first input of the reception multiplier 54.

The signal inputted in to the circulator 24 at the second port is divided into two signals. One of the divided signals is inputted into a first input of the reception multiplier 56. The other divided signal is inputted into a first input of the reception multiplier 58.

The reception multiplier 52 is, at a second input, supplied with the first frequency cosine local wave (cos $\omega_1 t$) from the variable frequency first frequency cosine local wave generator (cos $\omega_1 t$) 51 and outputs a signal generated by removing a cosine wave (cos $\omega_1 t$) of the carrier wave from the received signal, i.e., outputs a down-converted signal. An output signal of the reception multiplier 52 is inputted into the reception adder 48.

The reception multiplier 54 is, at second input, supplied with the second frequency cosine wave (cos $\omega_2 t$) from a variable frequency second frequency cosine local wave generator (cos $\omega_2 t$) 53. The reception multiplier 54 outputs a signal generated by removing the cosine wave (cos $\omega_2 t$) from the received signal, i.e., outputs a down-converted signal. An output signal of the reception multiplier 54 is inputted into a second input of the reception adder 48.

The reception adder 48 adds the output signal of the reception multiplier 52 and the output signal of the reception multiplier 54 and outputs an output signal. The output signal is inputted into a first input of the reception adder 38.

A reception multiplier 56 is at a second input thereof, supplied with a first frequency sine wave from the variable frequency first frequency sine local wave generator (sin $\omega_1 t$) 55. The reception multiplier 56 outputs a signal generated by removing the sine wave (sin $\omega_1 t$) of the carrier from the received signal, i.e., outputs a down-converted signal. The output signal of the reception multiplier 56 is inputted into a first input of the reception subtractor 49.

A reception multiplier 58 is, at second input thereof, supplied with the second frequency sine wave (sin $\omega_2 t$) of the variable frequency second frequency sine local wave generator (sin $\omega_2 t$) 57. The reception multiplier 58 outputs a signal generated by removing the sine wave (sin $\omega_2 t$) from the received signal, i.e., outputs a down-converted signal. An output signal of the reception multiplier 58 is inputted into a second input of the reception subtractor 49.

The reception subtractor 49 performs subtraction to output a difference between the output signal of the reception multiplier 56 and the output signal of the reception multiplier 58. The output signal is inputted into a second input of the reception adder 38.

The reception adder 38 adds (synthesizes) an output signal of the reception adder 48 and an output signal of the reception subtractor 49 and generates an output signal. The output signal is divided into two signals which are inputted into a first input of the reception multiplier 43 and a first input of the reception multiplier 47.

A connection relation among the reception multiplier 43, the first reception code generator (CC1) 41, the first reception code circulator 42, the own device code demodulation result measurement circuit ($P_1$) 2 have been described with reference to FIG. 1 in the first embodiment, and the duplication description is omitted.

Further, a connection relation among the reception multiplier 47, the second reception code generator (CC2) 45, the second code circulator 46, and the another device code demodulation result measurement circuit (P2) 3 have been described with reference to FIG. 1 in the first embodiment, and the duplication description is omitted.

Operation of Wireless Communication System According to Fourth Embodiment

According the wireless communication system according to the fourth embodiment, the output signal on which the code (CC1) of the first transmission code generator (CC1) 11 in the transmitter 304T of the wireless communication device 304 is superimposed, is transmitted to a second wireless communication device (not shown) from the first antenna (V) 21 and the second antenna (H) 22 by two rotating polarized waves on which the code (CC1) is superimposed.

The two rotating polarized waves are a first frequency rotating polarized wave generated by the cosine wave (cos $\omega_1 t$) and the sine wave (sin $\omega_1 t$).

The rotating polarized wave of the first frequency and the rotating polarized wave of the second frequency have different rotating directions, for example counterclockwise and clockwise.

Further, the cosine wave (cos $\omega_1 t$) and the sine wave (sin $\omega_1 t$), the second frequency cosine wave (cos $\omega_2 t$), the second frequency sine wave (sin $\omega_2 t$) also serve as a carrier wave of the electromagnetic wave.

As described above, the variable frequency first frequency cosine carrier wave generator 61, the variable frequency second frequency cosine carrier wave generator 63, the variable frequency first frequency sine carrier wave generator 65, and the variable frequency second frequency sine carrier wave generator 67 are controlled in frequency by the baseband circuit 90.

The two rotating polarized waves and the carrier wave can be arbitrary adjusted and optimized arbitrary.

Further, the signal transmitted through the shield member 99 (not shown), including the code (CC2) of the second transmission code generator (CC2) of the second wireless communication device (not shown) and the signal radiated by the transmitter 304T of the wireless communication device 304 and reflected by the shielding member (not shown) are received by the receiver 304R of the wireless communication device 304.

The baseband circuit (BB) 90 can know an electric power corresponding to a ratio of an electromagnetic wave energy of the signal transmitted by the second wireless communication device (not shown) as another communication device and transmitted through the material (shielding material) to the own communication device (the wireless communication device 304) and an electromagnetic energy which cannot be entered and transmitted through the material using a measurement result of the another device code demodulation result measurement circuit (P2) 3.

The reception multiplier 43 and the first reception code circulator 42, and the reception multiplier 47 and the second code circulator 46 calculate a shift of the polarized wave angle between the reception rotating polarization wave and the transmission rotating polarized wave under control of the baseband circuit (BB) 90.

As described above, an optimal carrier frequency, an optimal polarization waves (rotating polarized waves), and the first frequencies (cos $\omega_1 t$, sin $\omega_1 t$) and second frequency (cos $\omega_2 t$, sin $\omega_2 t$) for both wireless communication devices (the wireless communication device 304 and the second wireless communication device) can be obtained.

Advantageous Effect of Fourth Embodiment

According to the fourth embodiment, advantageous effect can be realized by using both two carrier waves and frequencies ($\omega_1$, $\omega_2$) for rotating polarized wave similarly to the first embodiment described with reference to FIG. 1.

More specifically, in the fourth embodiment shown in FIG. 4, it is possible to omit multiplier for multiplying signals of different frequency ranges as compared with the first embodiment shown in FIG. 1, so that analog multiplying circuit becomes unnecessary.

Accordingly, the wireless communication device has a longer life an advantageous effect in no trimming operation.

Fifth Embodiment

In the fifth embodiment of the present invention, an example of the wireless communication system for performing communication by transmission of electromagnetic waves through the material of the shield member is described below with reference to FIG. 5.

Figure 5:
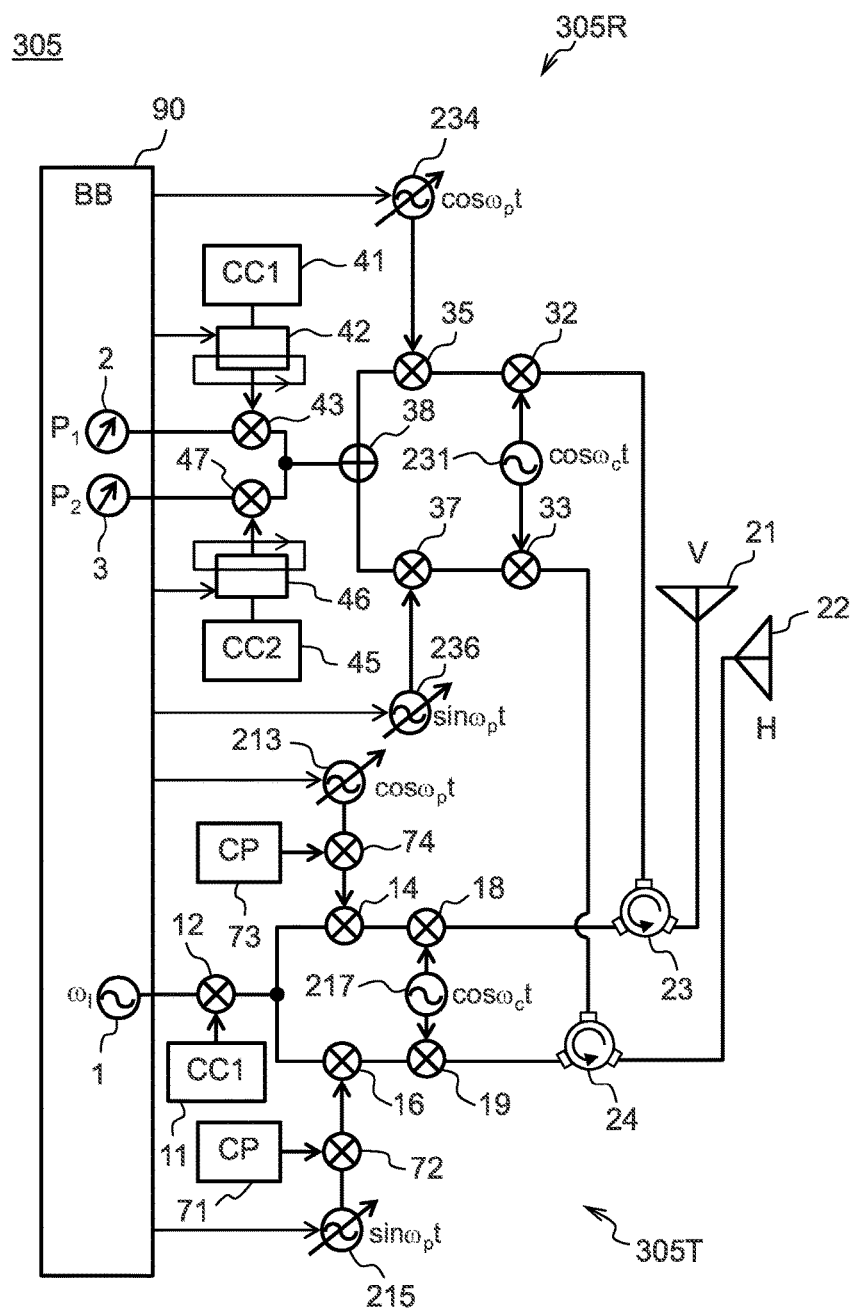
FIG. 5 is a block diagram of a wireless communication system according to a fifth embodiment of the present invention.

FIG. 5 shows an example of the wireless communication system according to the fifth embodiment of the present invention. However, only a first wireless communication device 305 is shown in FIG. 5, and descriptions of the second wireless communication device 301b and the shield member (material) 99 shown in FIG. 1 are omitted.

A wireless communication device 305 according to the fifth embodiment is provided by a part of the configuration in the second embodiment shown in FIG. 2 is modified.

In the configuration of the wireless communication device 305 and a transmitter 305T shown in FIG. 5 is different from the first wireless communication device 302 shown in FIG. 2 in a transmission multiplier 74 and a polarization identification code generator (CP) 73 which are newly added between the variable frequency rotating polarized wave frequency cosine wave generator (cos $\omega_p t$) 213 and the transmission multiplier 14 in FIG. 2.

Further, a transmission multiplier 72 and a polarization wave identification code generator 71 are provided between the variable frequency rotating polarized wave frequency sine wave generator 215 and the transmission multiplier 16 in FIG. 5.

Other configuration in FIG. 5 is the same as that in FIG. 2, and the duplication description is omitted.

In the transmitter 305T in FIG. 5, a first input of the transmission multiplier 74 is supplied with the cosine wave (cos $\omega_p t$) of the variable frequency rotating polarized wave frequency cosine wave generator (cos $\omega_p t$) 213, and a second input of the transmission multiplier 74 is supplied with signal of the polarization identification code generator (CP) 73.

Further, an output signal of the transmission multiplier 74 is inputted into a second input of the transmission multiplier 14. More specifically, the signal on which the polarization wave identification code (CP) is further superimposed is inputted into the transmission multiplier 14.

The sine wave (sin $\omega_p t$) of the variable frequency rotating polarized wave frequency sine wave generator (sin $\omega_p t$) 215 is inputted into a first input of the transmission multiplier 72, and a signal of the polarization wave identification code generator 71 is inputted into a second input of the transmission multiplier 72.

An output signal of the transmission multiplier 72 is inputted into a second input of the transmission multiplier 16. More specifically, the signal on which the polarization discriminating code (CP) is further superimposed is inputted into the transmission multiplier 16.

The polarization discriminating code (CP) has a cycle which is equivalent to one cycle of polarization rotation of the rotating polarized waves and each of the divided parts of one cycle are assigned with a plurality of bits for spreading the respective of the divided parts.

The signals including the polarization identification codes are transmitted from the transmitter 305T by the first antenna (V) 21 and the second antenna (H) 22.

When a receiver 305R receives a signal including the polarization identification code (CP) of another communication device (not shown) transmitted through the shield member (99, FIG. 1) or a signal including the polarization identification code (CP) of the own communication device (the wireless communication device 305, the transmitter 305T), reflected by the shield member (99, FIG. 1), the baseband circuit (BB) 90 can know a direction of the polarized wave used by the transmitter of the another device or own device in the time axis using a replica (not shown) of the polarized wave identification code stored therein.

Further, using measurement results of the own device code demodulation result measurement circuit ($P_1$) 2 and the another device code demodulation result measurement circuit ($P_2$) 3, the baseband circuit 90 recodes a polarized wave direction of the rotating polarized wave when a ratio of an intensity of the signal reproduced with the specific code assigned to another device to an intensity of the signal reproduced with the specific code assigned to the own device is a maximum ratio.

The wireless communication device 305 performs transmission using the propagation frequency (carrier wave frequency) and the polarized wave direction of the rotating polarized wave when the ratio becomes the maximum one for wireless communication.

Further, as described above, when the receiver 305R receives the signal including the polarized wave identification code (CP) of the another device (not shown) transmitted through the shield member (99, FIG. 1) or a signal including the polarized wave identification code (CP) of the own device (the wireless communication device 305, the transmitter 305T) of the own device reflected by the shield member (99, FIG. 1), the baseband circuit (BB) 90 can know a direction of the polarized wave used by the transmitter (another device or the own device) on the time axis using the replica (not shown) of the polarized wave code stored therein.

As described above, the baseband circuit 90 can recognize the rotating polarized wave on the time axis, and thus recognize a predetermined time (timing) when the ratio becomes the maximum ratio of the intensity of the signal reproduced with specific code assigned to another device to the intensity of the signal reproduced with the specific code assigned to the own device because it is possible to recognize the rotating polarized wave on the time axis.

Accordingly, the wireless communication device 305 can perform transmission using a predetermined time (timing) of the rotating cycle of the rotating polarized wave corresponding to the propagation frequency (carrier wave frequency) and a polarized wave direction when the ratio becomes a maximum ratio upon the wireless communication, Advantageous Effect of Fifth Embodiment According to the fifth embodiment, a preferable wireless communication can be provided even though the communication is made through a material having a loss (shielding member) because the carrier frequency and the polarized direction can be used by rotating polarized wave on which the code is superimposed in one cycle of the carrier frequency variation.

Sixth Embodiment

In the sixth embodiment of the present invention, an example of the wireless communication system for performing communication by transmission of electromagnetic waves through the material of the shield member is described below with reference to FIG. 6.

Figure 6:
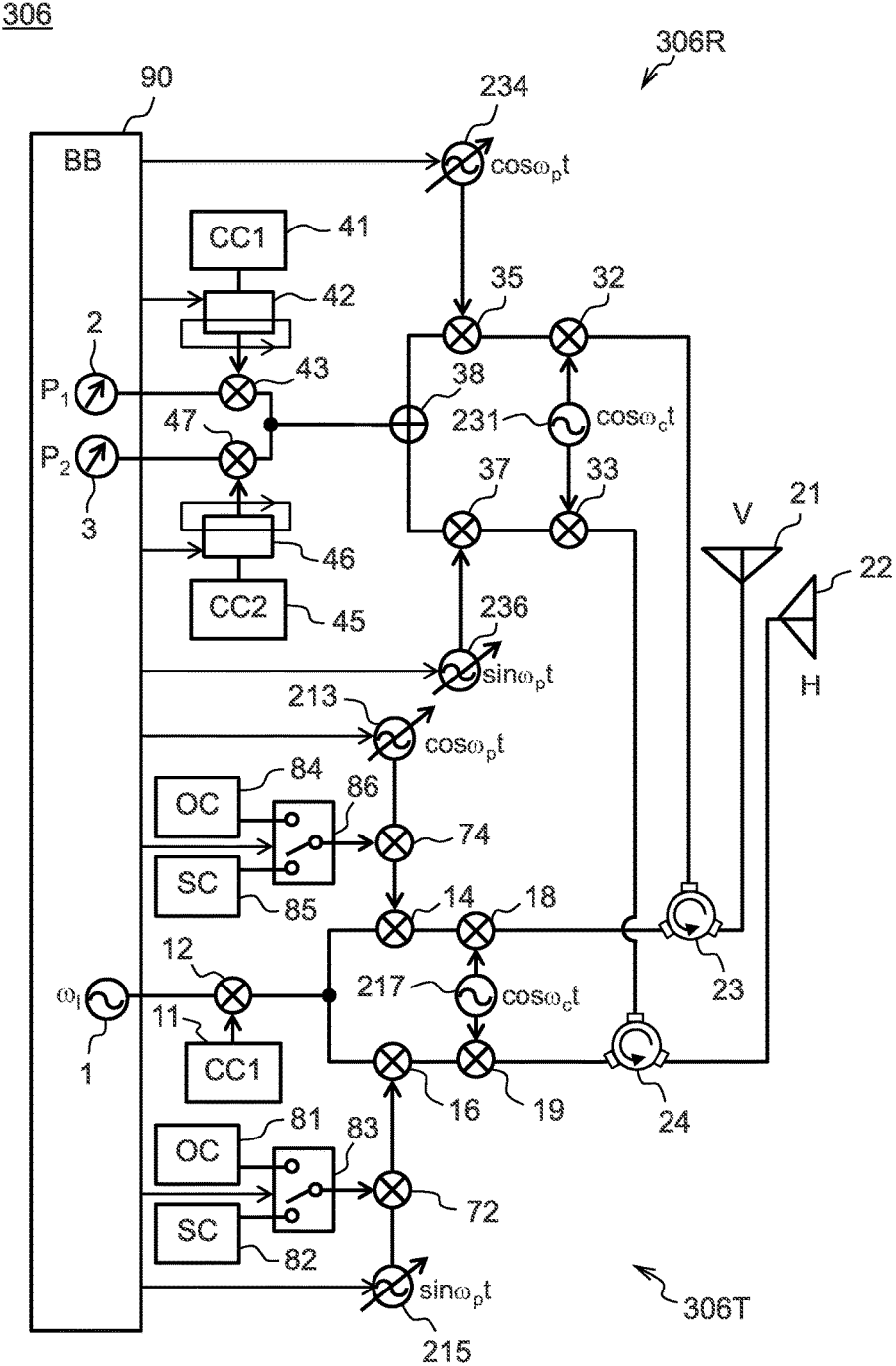
FIG. 6 is a block diagram of a wireless communication system according to a sixth embodiment of the present invention.

FIG. 6 shows the example of the wireless communication system according to the sixth embodiment of the present invention. However, only a first wireless communication device 306 is shown in FIG. 6, and descriptions of the second wireless communication device 301b and the shield member (material) 99 shown in FIG. 1 are omitted.

The first wireless communication device 306 shown in FIG. 6 is provided by modifying a part of the fifth embodiment shown in FIG. 5.

In the configuration of a transmitter 306T shown in FIG. 6, the wireless communication device 306T is different from the transmitter 305T of the wireless communication device 305 shown in FIG. 5 is in the polarization identification code generator (CP) 73 is replaced in FIG. 6 with a polarized wave identification orthogonal code (OC) 84, a synchronizing code generator (SC) 85, and a code switch 86.

Further, the polarization wave discriminating code generator (CP) 71 in FIG. 5 is replaced in FIG. 6 with a polarized wave identification orthogonal code generator (OC) 81, a synchronizing code generator (SC) 82, and a code switch 83. Pseudo Noise Codes generated by the polarized wave identification orthogonal code (OC) 84 and the polarized wave identification orthogonal code generator (OC) 81 are orthogonal codes such as PN codes (Pseudo Noise).

Other configuration in FIG. 5 is the same as that in FIG. 2, and the duplication description is omitted.

In FIG. 6, an output signal of the polarized wave identification orthogonal code (OC) 84 and an output signal of the synchronizing code generator 85 are selected by the code switch 86 and the selected output signal is inputted into a second input of the transmission multiplier 74.

Further, an output signal of the polarized wave identification orthogonal code generator (OC) 81 and an output signal of the synchronizing code generator (SC) 82 are selected by the code switch 83, and the selected output signal is inputted into a second input of the transmission multiplier 72.

Further the code switch 86 and the code switch 83 are controlled by the baseband circuit (BB) 90.

When the baseband circuit (BB) 90 selects the synchronizing codes (SC) using the code switches 83, 86, the baseband circuit (BB) 90 performs synchronizing between own device (the first wireless communication device 306) and the another device (not shown) using a replica of the synchronizing code held therein.

Further, when the baseband circuit (BB) 90 selects the polarized wave identification code orthogonal code (OC) using the code switches 83, 86, and the baseband circuit (BB) 90 performs an operation equivalent to the wireless communication device 305 of the fifth embodiment shown in FIG. 5.

As described above, the first wireless communication device 306 and a second wireless communication device (not shown) separate the period for searching the optimal propagation frequency and the period for communication by providing the polarized wave identification orthogonal code generators (OC) 81, 84, the synchronizing code generators (SC) 82, 85, and the code switches 83, 86.

More specifically, the first wireless communication device 306 and the second wireless communication device (not shown) each have the period for searching the propagation frequency having a maximum ratio of the intensity of the signal reproduced with the specific code assigned to the another device to an intensity of the signal reproduced with the specific code assigned to the own device and perform communication using the searching resultant propagation frequency for a different period.

Advantageous Effect of Sixth Embodiment

According to the sixth embodiment, the code assigned to one cycle of the rotating polarized wave can enhance time-division resolution determining a specific timing within one cycle of the rotating polarized wave because the code assigned to one cycle of the rotating polarized wave is orthogonal codes such as PN code, etc. as described above.

Seventh Embodiment

In the seventh embodiment of the present invention, an example of the wireless communication system for performing communication by transmission of electromagnetic waves through the material of the shield member is described below with reference to FIG. 5.

Figure 7:
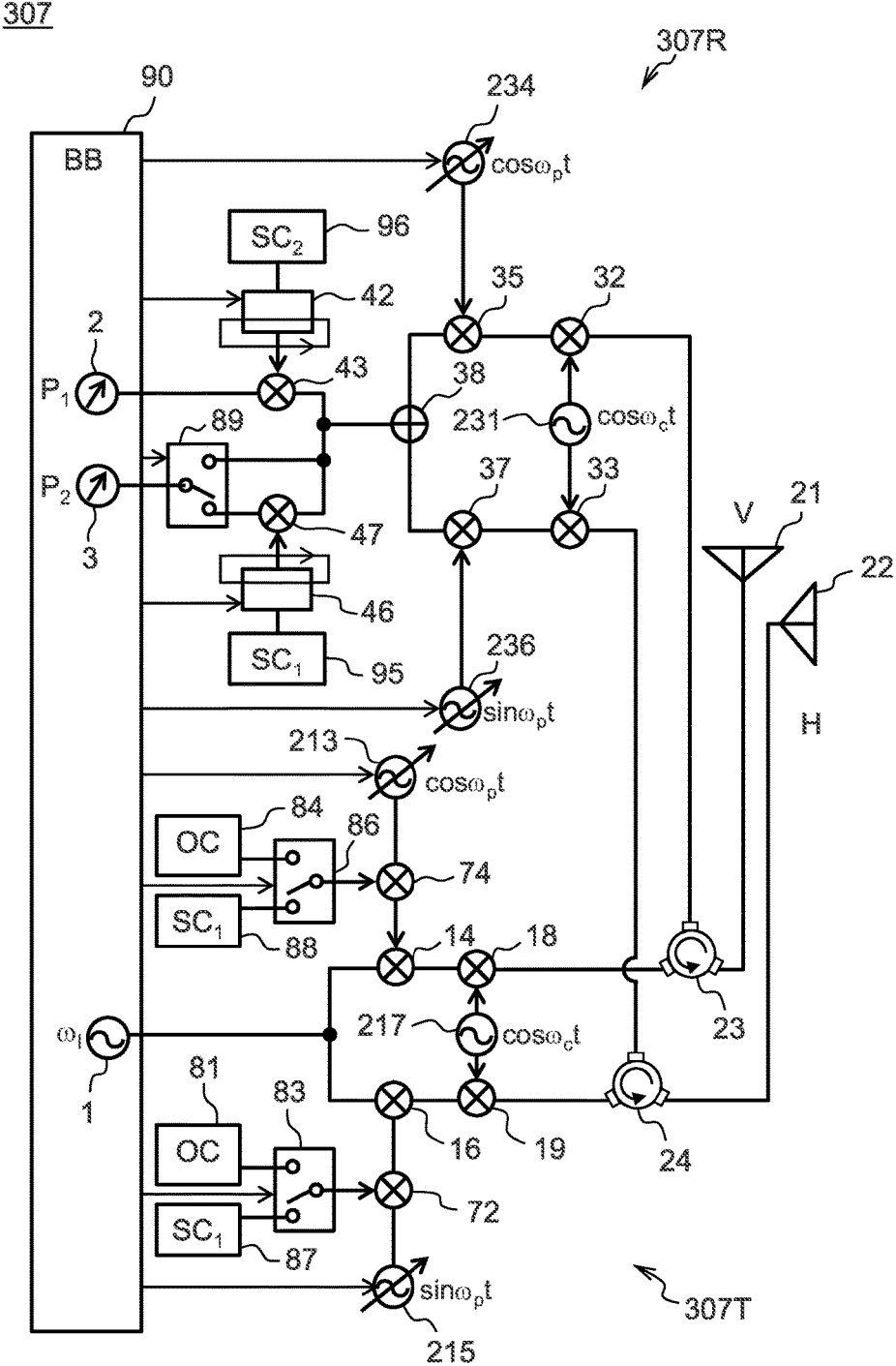
FIG. 7 is a block diagram of a wireless communication system according to a seventh embodiment of the present invention.

FIG. 7 shows the example of the wireless communication system according to the seventh embodiment of the present invention. However, only a first wireless communication device 307 is shown in FIG. 7, and descriptions of the second wireless communication device 301b and the shield member (material) 99 shown in FIG. 1 are omitted.

The wireless communication device 307 shown in FIG. 7 is provided by modifying a part of the sixth embodiment shown in FIG. 6.

In the configuration of the transmitter 307T of a wireless communication device 307 and a transmitter 306T of the first wireless communication device 306 shown in FIG. 6 is different in that the first transmission code generator (CC1) 11 and the transmission multiplier 12 shown in FIG. 6 are omitted.

Instead, the synchronizing code generators (SC) 82, 85 in FIG. 6 are replaced with a first specific synchronizing code generators (SC1) 87, 88.

Further, in the configuration of the receiver 307R in the wireless communication device 307 in FIG. 7, the first reception code generator (CC1) 41 is replaced with a specific synchronizing code generator (SC2) 96 in FIG. 7.

Further, in the configuration of a receiver 307R in FIG. 7, the second reception code generator (CC2) 45 is replaced with a first specific synchronizing code generator (SC1) 95 in FIG. 7.

In FIG. 7, a code switch 89 is newly provided. The code switch 89 inputs an output signal of the reception multiplier 47 and an output of the reception adder 38 and selects one of these output signals to input the selected output signal to the another device code demodulation result measurement circuit (P2) 3.

The code switch 89 performs switching operation under control of the baseband circuit (BB) 90.

Since other configuration is similar to FIGS. 5 and 2, a duplication description is omitted.

In the configuration of the wireless communication device 307 according to the seventh embodiment, the code (SC) for synchronizing the transceiver and the codes (CC1, CC2) for identifying the devices forming the wireless communication system, wherein the codes (CC1, CC2) forming the wireless communication are made equivalent values (SC1, SC2) to each other.

In the seventh embodiment, after performing synchronization between the transmitter and the receiver using the specific synchronizing code (SC1, SC2) for identifying respective devices (own device and the another device), an optimal carrier wave frequency ($\omega_C$) and an optimal polarized wave direction ($\omega p$) are obtained to have a maximum intensity of an incoming signal from the other wireless communication device through the material (shield member). During this period, transmission and reception of the specific synchronizing codes (SC1, SC2) are not performed.

As described above, the wireless communication device 307 and the second wireless communication device (not shown) can recognize individual operations in a separated manner in the rotating cycle of the rotating polarized wave by providing the codes (SC) for synchronizing between the transmitter and the receiver and the codes (SC1, SC2) which are equivalent to the codes (CC1, CC2) for identifying the devices forming the wireless communication system.

Accordingly, the wireless communication device 307 and the second wireless communication device (not shown) can decrease an transmission output power other than a predetermined timing in the rotating cycle of the rotating polarized wave corresponding to the propagation frequency and the polarized direction which provides the ratio of the intensity of the signal reproduced with the specific code assigned to the another device to the intensity of the signal reproduced with the specific code assigned to the own device.

Advantageous Effect of Seventh Embodiment

According to the seventh embodiment, it is possible to save digital signal processing quantity inside the wireless communication device 307, which provides an advantageous effect to reduce the power consumption of the wireless communication device 307.

Further, is possible to save the transmission power other than the predetermined timing in the rotating cycle of the rotating polarized wave, which provides an advantageous effect in saving the power consumption of the wireless communication device 307.

Eighth Embodiment

In the eighth embodiment of the present invention, an example of the wireless communication system for performing communication by transmission of electromagnetic waves through the material of the shield member is described below with reference to FIG. 8.

Figure 8:
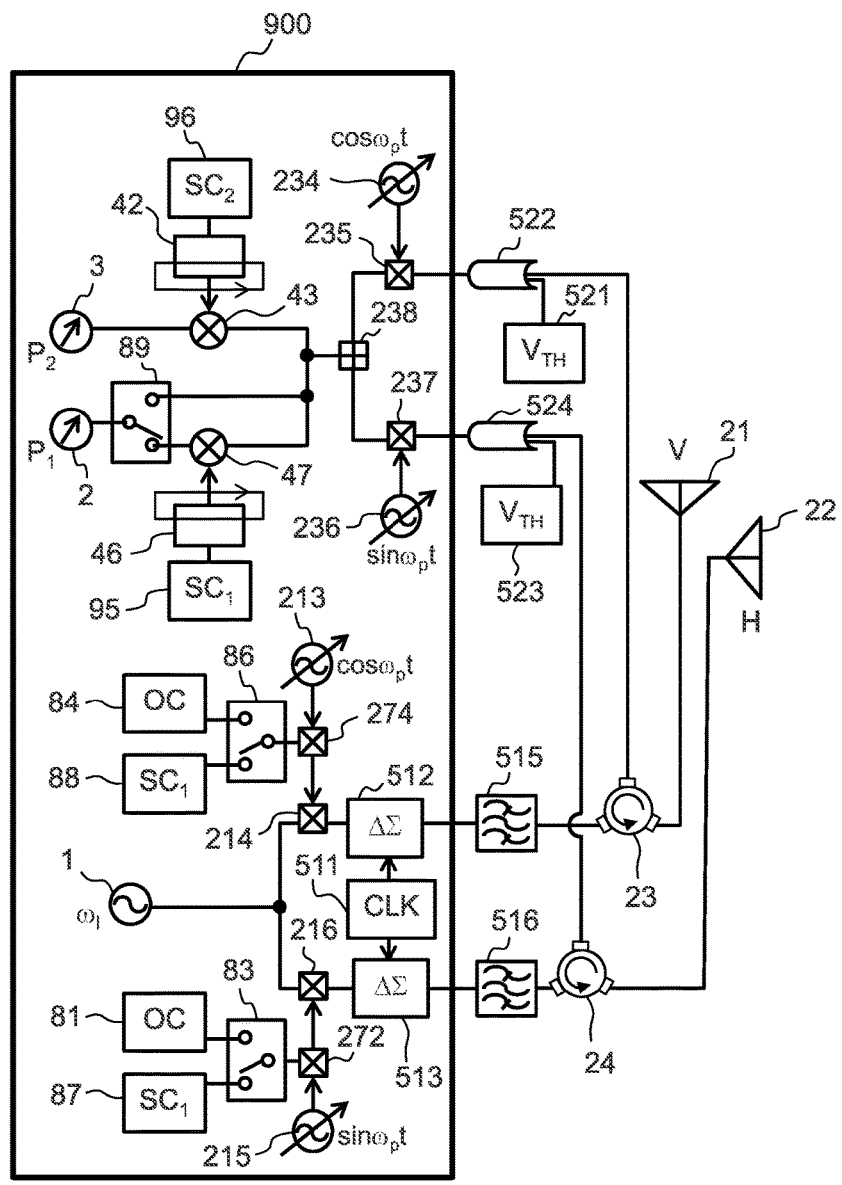
FIG. 8 is a block diagram of a wireless communication system according to an eighth embodiment of the present invention.

FIG. 8 is a block diagram of an example of a wireless communication system according to the eighth embodiment of the present invention.

However, only a first wireless communication device 308 is shown in FIG. 8, and descriptions of the second wireless communication device 301b and the shield member (material) 99 shown in FIG. 1 are omitted.

The wireless communication device 308 according to the eighth embodiment shown in FIG. 8 is configured to provide all functions of the transmitter 307T and the receiver 307R shown in FIG. 7 with digital circuits.

In FIG. 8, a wireless communication device 308 is configured including a digital signal processing unit 900, filters 515, 516, comparators 522, 524, threshold generators 521, 523, the circulators 23, 24, the first antenna (V) 21, and the second antenna (H) 22.

Digital Signal Processing Unit 900

The digital signal processing unit 900 (digital signal processor) is described below.

The information signal generator ($\omega_I$) 1, the own device code demodulation result measurement circuit ($P_1$) 2, the another device code demodulation result measurement circuit ($P_2$) 3, the synchronizing code generators (SC1) 87, 88, 95, the specific synchronizing code generator (SC2) 96, the first reception code circulator 42, 46, the polarized wave identification orthogonal code generators (OC) 81, 84, the code switches 83, 86, 89, the reception multipliers 43, 47, a variable frequency rotating polarized wave frequency cosine wave generator 234, a variable frequency rotating polarized wave frequency sine wave generator 236, a rotating polarized wave frequency cosine wave generator (cos $\omega_P t$) 213, the variable frequency rotating polarized wave frequency sine wave generator (sin $\omega_P t$) 215 in the digital signal processing unit 900 shown in FIG. 8 have the same configurations of elements designated with same references in FIG. 7, respectively.

Further, the reception digital multipliers 235, 237, transmission multipliers 214, 216, 272, 274, and the reception digital synthesizing circuit 238 in the digital signal processing unit 900 shown in FIG. 8 have functions corresponding to the reception multipliers 35, 37, the transmission multipliers 14, 16, 72, 74, and the reception adder 38 and are replaced with a digital circuit (digital signal processing).

Further, in FIG. 8, the circuit having configuration including the delta☐sigma circuits 512, 513 as the delta-sigma circuits 512, 513, a clock supplying circuit 511, and the filters 515, 516 corresponding to the configuration including the transmission multipliers 18, 19, and the local wave generator (cos $\omega_C$t) 217.

Since the above-described delta-sigma circuits 512, 513, and the clock supplying circuit 511 can be configured with a digital circuit (digital signal processing), it is possible to be installed in the digital signal processing unit 900 shown in FIG. 8.

The filters 515, 516 are not suitable for the digital signal processing, and installed outside the digital signal processing unit 900.

An output of the filter 515 is connected to a first port of the circulator 23.

An output of the filter 516 is connected to a first port of the circulator 24.

The first antenna (V) 21 is connected to the circulator 23.

The second antenna (H) 22 is connected to the circulator 24.

A second port of the circulator 23 is connected to a first input of the comparator 522.

A second port of the circulator 24 is connected to a first input of a comparator 524.

An output of threshold (VTH) generated by the threshold generator 521 is inputted into a second input of the comparator 522.

The comparator 522 compares the received signal from the first antenna (V) 21 with the threshold (VTH), and inputs a resultant signal into a first input of the reception digital multiplier 235 of the digital signal processing unit 900.

The output of the threshold (VTH) generated by a threshold generator 523 is inputted into a second input of the comparator 524.

The comparator 524 compares the received signal from the second antenna (H) 22 with the threshold (VTH), and inputs the resultant signal into a first input of a digital multiplier 237 of the digital signal processing unit 900.

According to the configuration shown in FIG. 8, the wireless communication device 308 according to the eighth embodiment has basically the same function as the wireless communication device 307 according to the seventh embodiment described with reference to FIG. 7.

Advantageous Effect of Eighth Embodiment

According to the wireless communication device 308 according to the eighth embodiment described with reference to FIG. 8, the configuration using digital circuits to have the digital signal process can be provided, This provides advantageous effects such as a long life, no trimming operation, a high reliability, and down-sizing of the device (wireless communication device).

Ninth Embodiment

In the ninth embodiment of the present invention, an example of the wireless communication system for performing communication by transmission of electromagnetic waves through the material of the shield member is described below with reference to FIG. 9.

Figure 9:
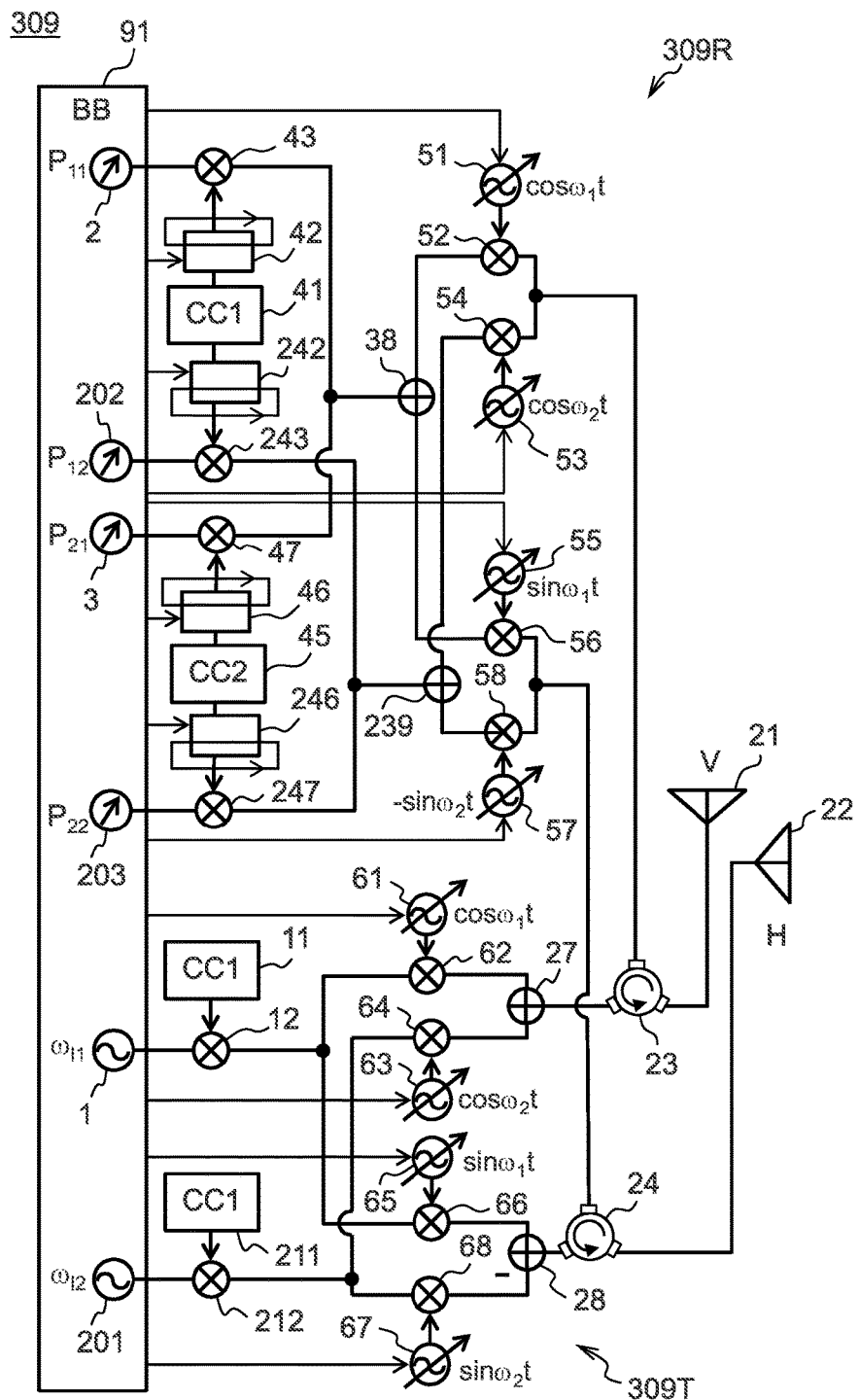
FIG. 9 is a block diagram of a wireless communication system according to a ninth embodiment of the present invention.

FIG. 9 shows an example of the wireless communication system according to the ninth embodiment of the present invention. However, only a first wireless communication device 309 is shown in FIG. 9, and descriptions of the second wireless communication device 301b and the shield member (material) 99 shown in FIG. 1 are omitted.

A wireless communication device 309 shown in FIG. 9 is provided to increase a wireless communication capacity using an information signal generator ($\omega_I$) 1 and an information signal generator ($\omega_{I2}$) 201 as two information sources, and two frequencies ($\omega_1$, $\omega_2$).

Configuration Elements in Transmitter 309T

The transmitter 309T is configured including a transmission circuit including the information signal generator (coil) 1, the information signal generator (coil) 201, the first transmission code generators (CC1) 11, 211, the transmission multipliers 12, 62, 64, 66, 68, 212, the variable frequency first frequency cosine carrier wave generator (cos $\omega_1$t) 61, the variable frequency second frequency cosine carrier wave generator (cos $\omega_2$t) 63, the variable frequency first frequency sine carrier wave generator (sin $\omega_1$t) 65, the variable frequency second frequency sine carrier wave generator (sin $\omega_2$t) 67, the transmission adder 27, the transmission subtractor 28, and further include the first antenna (V) 21 and the second antenna (H) 22 as transmission antennas.

As described above, the first antenna (V) 21 and the second antenna (H) 22 are used as the transmission antennas (21, 22) using operations of the circulators 23, 24.

Further, the information signal generator ($\omega_{I1}$) 1 corresponds to the information signal generator ($\omega_I$) 1.

Connection Configuration of Elements in Transmitter 309T

In the transmitter 309T of the wireless communication device 309, an output signal of the information signal generator ($\omega_{I1}$) 1 is inputted into a first input of the transmission multiplier 12.

A second input of the transmission multiplier 12 is supplied with the transmission code (CC1) of the first transmission code generator (CC1) 11 in which the information signal ($\omega_{I1}$) is spread by superimposing the transmission code (CC1) thereon.

An output signal of the transmission multiplier 12 is divided into two.

One of the divided output signals is inputted into a first input of the transmission multiplier 62.

The output signal of the other of the divided output signals is inputted into a first input of the transmission multiplier 66.

A second input of the transmission multiplier 62 is supplied with a cosine wave (cos $\omega_1$t) of the variable frequency first frequency cosine carrier wave generator 61 in which the cosine wave (cos $\omega_1$t) is superimposed (modulated) on the output signal of the transmission multiplier 62.

A second input of the transmission multiplier 66 is supplied with a sine wave (sin $\omega_1$t) of the variable frequency first frequency sine carrier wave generator 65 in which a sine wave (sin $\omega_1$t) is superimposed (modulated) on the output signal of the transmission multiplier 66.

An output signal of the information signal generator (coil) 201 is inputted into a first input of a transmission multiplier 212.

A second input of the transmission multiplier 212 is supplied with the transmission code (CC1) of a transmission code generator (CC1) 211, in which the information signal ($\omega_{I2}$) is spread by superimposing (multiplying) the transmission code (CC1) thereon.

An output signal of the transmission multiplier 212 is divided into two.

One of the divided output signals is inputted into a first input of the transmission multiplier 64.

The other of the divided output signals is inputted into a first input of the transmission multiplier 68.

A second input of the transmission multiplier 64 is supplied with the cosine wave (cos $\omega_2 t$) of the variable frequency second frequency cosine carrier wave generator 63, in which the cosine wave (cos $\omega_2 t$) is superimposed (modulated) on the output signal of the transmission multiplier 64.

A second input of the transmission multiplier 68 is supplied with a sine wave (sin $\omega_2 t$) of the variable frequency second frequency sine carrier wave generator 67, in which the sine wave (sin $\omega_2 t$) is superimposed (modulated) on the output signal of the transmission multiplier 68.

The output signal of the transmission multiplier 62 and the output signal of the transmission multiplier 64 are inputted into first and second inputs of the transmission adder 27, respectively.

The transmission adder 27 adds (synthesizes) the output signal of the transmission multiplier 62 and the output signal of the transmission multiplier 64. The synthesized output is inputted into a first port of the circulator 23.

The output signal of the transmission multiplier 66 and the output signal of the transmission multiplier 68 are inputted into first and second inputs of the transmission subtractor 28, respectively.

The transmission subtractor 28 performs subtraction between the output signal of the transmission multiplier 66 and the output signal of the transmission multiplier 68 to have a difference.

The process of radiating electromagnetic waves by the first antenna (V) 21 from the circulator 23 and the process of radiating electromagnetic waves by the second antenna (H) from the circulator 24 are similar, and duplicated descriptions are omitted.

Configuration of Receiver 309R

Next, a configuration of the receiver 309R is described below.

The wireless communication device 309 is configured including the first antenna (V) 21, the second antenna (H) 22, the circulators 23, 24, the reception multipliers 43, 47, 52, 54, 56, 58, 243, 247, the variable frequency first frequency cosine local wave generator (cos $\omega_1 t$) 51, the variable frequency second frequency cosine local wave generator (cos $\omega_2 t$) 53, the variable frequency first frequency sine local wave generator (sin $\omega_1 t$) 55, the variable frequency second frequency sine local wave generator (sin $\omega_2 t$) 57, the reception adders 38, 239, the second reception code generator (CC2) 45, first reception code generator (CC1) 41, the second reception code generator (CC2) 45, the first reception code circulators 42, 242, the second code circulators 46, 246, the own device code demodulation result measurement circuit ($P_1$) 2, an own device code demodulation result measurement circuit ($P_{12}$) 202, the another device code demodulation result measurement circuit ($P_{21}$) 3, and the another device code demodulation result measurement circuit ($P_{22}$) 203.

As described above, the first antenna (V) 21 and the second antenna (H) 22, and the circulators 23, 24 are used for the receiver 309R and the transmitter 309T.

In the configuration described above, the configuration except the first antenna (V) 21, the second antenna (H) 22, and the circulators 23, 24 are designated as a receiving circuit of the receiver 309R as needed.

The own device code demodulation result measurement circuit ($P_{11}$) 2 corresponds to the own device code demodulation result measurement circuit ($P_1$) 2 shown in FIGS. 1 to 8.

The another device code demodulation result measurement circuit (P21) 3 corresponds to the another device code demodulation result measurement circuit (P2) 3 shown in FIGS. 1 to 8.

General functions of configuration elements of receiver 301R Functions of the first antenna (V) 21, the second antenna (H) 22, the circulators 23, 24, the reception multipliers 43, 47, 52, 54, 56, 58, 243, 247, the variable frequency first frequency cosine local wave generator (cos $\omega_1 t$) 51, the variable frequency second frequency cosine local wave generator (cos $\omega_2 t$) 53, the variable frequency first frequency sine local wave generator (sin $\omega_1 t$) 55, the variable frequency second frequency sine local wave generator (sin $\omega_2 t$) 57, the reception adders 38, 239, the first reception code generator (CC1) 41, the second reception code generator (CC2) 45, the first reception code circulator 42, 242, the second code circulator 46, 246, the own device code demodulation result measurement circuit ($P_{11}$) 2, the own device code demodulation result measurement circuit ($P_{12}$) 202, the another device code demodulation result measurement circuit ($P_{21}$) 3, and the another device code demodulation result measurement circuit (P22) 203 are the same as those described with reference to FIGS. 1 and 4, and the descriptions are therefore omitted.

In FIG. 9, the variable frequency second frequency sine local wave generator ($-\sin \omega_2 t$) 57 generates the sine wave having a negative sign ($-\sin \omega_2 t$). This is different from that the variable frequency second frequency sine local wave generator 57 generates the sine wave having a positive sign (sin $\omega_2 t$), i.e., signs, are different.

Therefore, in FIG. 4, the reception subtractor 49 is used. On the other hand, in FIG. 9, a reception adder 239 is used.

Connection Configuration of Elements in Wireless Communication Device 309

Descriptions about connection relations of the first antenna (V) 21, the second antenna (H) 22, the circulators 23, 24 are the same as those made for FIG. 1, and thus, duplicated descriptions are omitted.

An output signal of the second port of the circulator 23 is divided into two signals. One of the divided signals is inputted into a first input of the reception multiplier 52. The other of the divided signals is inputted into a first input of the reception multiplier 54.

An output of the second port of the circulator 24 is divided into two signals. One of the divided signals is inputted into a first input of the reception multiplier 56. The other of the divided signals is inputted into a first input of the reception multiplier 58.

The second input of the reception multiplier 52 is supplied with the first frequency cosine wave (cos $\omega_1 t$) of the variable frequency first frequency cosine local wave generator (cos $\omega_1 t$) 51. The reception multiplier 52 outputs a down-converted signal in which the reception multiplier 52 removes the cosine (cos $\omega_1 t$) of the carrier wave from the received signal. The output of the reception multiplier 52 is inputted into the first input of the reception adder 38.

The second input of the reception multiplier 54 is supplied with the second frequency cosine wave (cos $\omega_2 t$) of the variable frequency second frequency cosine local wave generator (cos $\omega_2 t$) 53. The reception multiplier 54 outputs a down-converted signal in which the reception multiplier 54 removes the cosine wave (cos $\omega_2 t$) of the carrier from the received signal. The output signal of the reception multiplier 54 is inputted into a first input of the reception adder 239.

The second input of the reception multiplier 56 is supplied with the first frequency sine local wave (sin $\omega_1 t$) of the variable frequency first frequency sine local wave generator (sin $\omega_1 t$) 55 in which the reception multiplier 56 outputs a down-converted signal in which the reception multiplier 56 removes the sine wave (sin $\omega_1 t$) of the carrier from the received signal. The output of the reception multiplier 56 is inputted into the second input of the reception adder 38.

The second input of the reception multiplier 58 is supplied with the second frequency sine wave ($-\sin \omega_2 t$) and outputs a down-converted signal in which the reception multiplier 58 removes the sine wave ($-\sin \omega_2 t$) from the received signal. The output signal of the reception multiplier 58 is inputted into a second input of the reception adder 239.

The reception adder 38 adds (synthesize) the output signal of the reception multiplier 52 and the output signal of the reception multiplier 56. The synthesized output signal is divided into two signals which are inputted to the first input of the reception multiplier 43 and the first input of the reception multiplier 47, respectively.

The reception adder 239 adds (synthesize) the output signal of the reception multiplier 54 and the output signal of the reception multiplier 58. The synthesized output signal is divided into two signals which are inputted to the first input of the reception multiplier 243 and the first input of the reception multiplier 247, respectively.

The code at the output of the first reception code generator (CC1) 41 is inputted into the first reception code circulator 42 and a code circulator 242. The output signal of the first reception code circulator 42 is inputted into the second input of the reception multiplier 43.

Multiplication is made with the reception multiplier 43 to have a maximum value in a correlation calculation result through circulation of the output signal of the first reception code generator (CC1) 41 with control of the first reception code circulator 42.

The output signal of the reception multiplier 43 is inputted into the own device code demodulation result measurement circuit ($P_{11}$) 2.

As described above, the first input of the reception multiplier 43 includes the frequency ($\omega_1$).

The own device code demodulation result measurement circuit ($P_{11}$) 2 detects to what extent the signal received from the first antenna (V) 21 and the second antenna (H) 22 through the frequency ($\omega_1$) includes the signal on which the code (CC1) of own device is superimposed.

Further, the code at the output of the first reception code generator (CC1) 41 is also inputted into the code circulator 242 as described above. An output signal of the code circulator 242 is inputted into a second input of a reception multiplier 243.

Multiplication is made with the reception multiplier 243 to have a maximum value in a correlation calculation result through circulation of the output signal of the first reception code generator (CC1) 41 with control of the first reception code circulator 242.

An output signal of the reception multiplier 243 is inputted into the own device code demodulation result measurement circuit (P12) 202.

As described above, a first input of the reception multiplier 243 includes the frequency ($\omega_2$).

The own device code demodulation result measurement circuit ($P_{12}$) 202 detects to what extent the signals received from the first antenna (V) 21 and the second antenna (H) 22 through the frequency ($\omega_2$) include the signal on which the code (CC1) of the own device is superimposed.

The code at the output of the second reception code generator (CC2) 45 is inputted into the second code circulator 46 and a code circulator 246. The output signal of the second code circulator 46 is inputted into the second input of the reception multiplier 47.

Multiplication is made with the reception multiplier 47 to have a maximum value in a correlation calculation result through circulation of the output signal of the second code circulator 46.

The output signal of the reception multiplier 47 is inputted into the another device code demodulation result measurement circuit (P21) 3.

As described above, the frequency ($\omega_1$) is included in the first input of the reception multiplier 47.

The another device code demodulation result measurement circuit (P21) 3 detects to what extent the signal received from the first antenna (V) 21 and the second antenna (H) 22 through the frequency ($\omega_1$) includes the signal on which the code of the another device (CC2) is superimposed.

Further the code at the output of the second reception code generator (CC2) 45 is inputted also into the code circulator 246 as described above. An output signal of the code circulator 246 is inputted into a second input of a reception multiplier 247.

Multiplication is made with the reception multiplier 247 to have a maximum value in a correlation calculation result through circulation of the output signal of the second reception code generator (CC2) 45 by the code circulator 246.

The output signal of the reception multiplier 247 is inputted into the another device code demodulation result measurement circuit (P22) 203.

As described above, the first input of the reception multiplier 247 includes the frequency ($\omega_2$).

The another device code demodulation result measurement circuit (P22) 203 detects to what extent the signal received from the first antenna (V) 21 and the second antenna (H) 22 through the frequency ($\omega_2$) includes the signal on which the code of the another device (CC2) is superimposed.

As described above, in the wireless communication device 309 according to the ninth embodiment, the transmitter 309T includes two information sources, i.e., the information signal generator ($\omega_{f1}$) 1 and the information signal generator ($\omega_{f2}$) 201 and has a function of transmitting two rotating polarized waves with two frequencies ($\omega_1$, $\omega_2$). The receiver 309R includes the own device code demodulation result measurement circuit ($P_{11}$) 2, the own device code demodulation result measurement circuit ($P_{12}$) 202, the another device code demodulation result measurement circuit ($P_{21}$) 3, and the another device code demodulation result measurement circuit ($P_{22}$) 203. This configuration provides an increased information quantity of the wireless communication.

Advantageous Effect of Ninth Embodiment

According to the ninth embodiment, it is possible to transmit different information signals ($\omega_{f1}$, $\omega_{f2}$) using two different frequencies ($\omega_1$, $\omega_2$) forming the rotating polarized waves, which provides an increased wireless communication quantity.

Tenth Embodiment

In the tenth embodiment of the present invention, an example of the shielded yard wireless communication system for performing communication by transmission of electromagnetic waves through the material of the shield member using any one of the wireless communication devices according to the first to ninth embodiments is described below with reference to FIG. 10.

Figure 10:
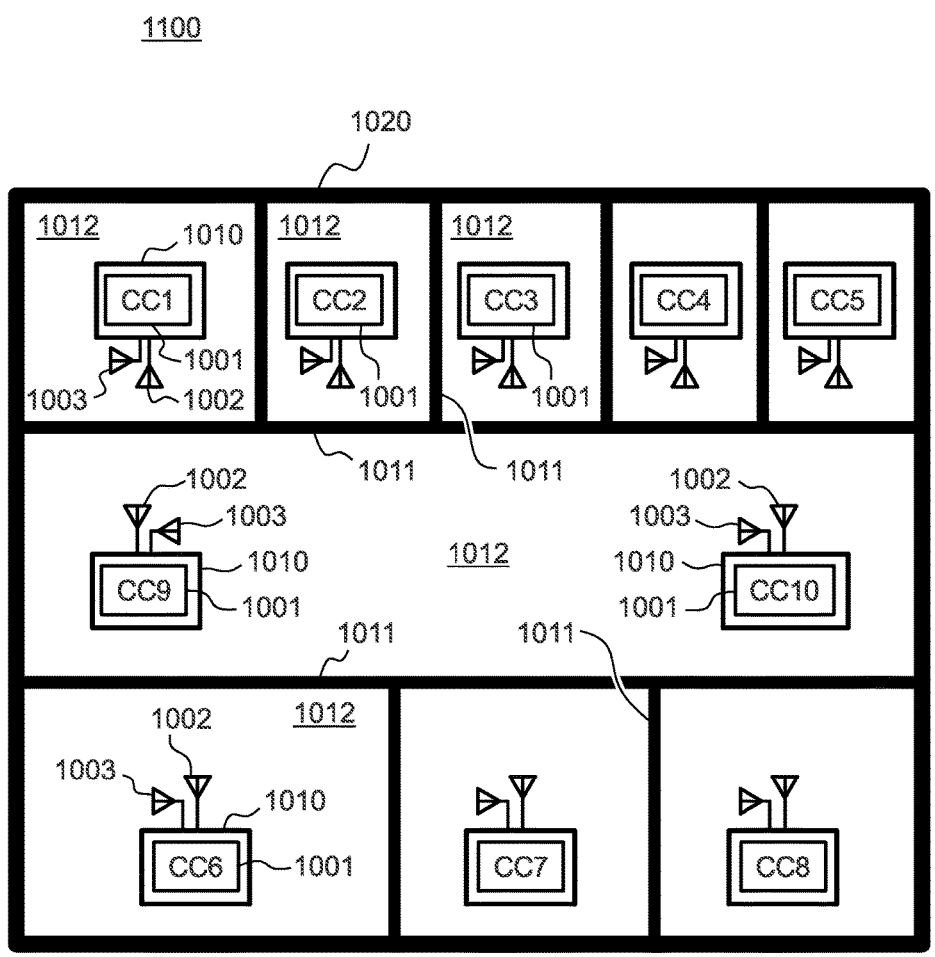
FIG. 10 is a block diagram of a shield yard wireless communication system according to a tenth embodiment of the present invention.

FIG. 10 shows an example of a wireless communication system 1100 according to the tenth embodiment of the present invention.

In FIG. 10, in a shielded yard 1020 which is a wireless communication area, there are a plurality of rooms 1012, each enclosed by a plurality of a shielding walls 1011 without a gap.

It is noted that in FIG. 10, only typical rooms are designated with the reference numeral "1012", and not all the rooms are indicated by the reference numeral "1012". Similarly, typical ones of the shielding walls 1011, wireless communication devices 1010, antennas 1002, 1003, own device codes 1001 are designated with the reference numerals, and indication of the reference numerals for other ones are omitted.

In a plurality of the rooms 1012 enclosed by the shielding walls 1011 without gap, a plurality of the wireless communication devices 1010 are installed, respectively. In FIG. 10, there are ten wireless communication devices 1010.

As the wireless communication devices 1010, any ones of the wireless communication devices 301 to 309 are used.

The wireless communication device 1010 includes two antennas spatially orthogonal with each other, i.e., the antennas 1002, 1002 to transmit and receive signals superimposed on a rotating polarized wave.

Further, the wireless communication device 1010 is assigned with the own device code 1001 for identifying each of devices therein. For example, in FIG. 10, ten wireless communication devices 1010 are assigned with the own device codes (specific code of own device) of CC1 to CC10, respectively.

Each of (for example, ten of) the wireless communication devices 1010 has all own device codes including its own code and own codes of another device. In other words, each of the wireless communication devices shares own codes of all of the communication devices.

Each of a plurality of the wireless communication devices 1010 perform radio transmission by spreading data with assigned own device code using rotating polarized wave ($\omega p$, $\omega_1$, or $\omega_2$) of which propagation frequency ($\omega_C$, $\omega_{C1}$, or $\omega_{C2}$) is varied.

Each of the wireless communication devices 1010 demodulates the received signals and adjusts the propagation frequency ($\omega_C$, $\omega_{C1}$, or $\omega_{C2}$) to have a maximum ratio of the intensity of the signal reproduced with the specific code assigned to the another device to an intensity of the signal reproduced with the specific code assigned to the own device.

During this, out of all polarized waves from the rotating polarized waves, the polarized wave having the ratio is greatest is selected to perform the process.

According to this communication method, though there is the shielding wall 1011 in the transmission path, a wireless communication can be provided by use of an optimal propagation frequency ($\omega_C$, $\omega_{C1}$, or $\omega_{C2}$) and optimal rotating polarized wave ($\omega_P$, $\omega_1$, or $\omega_2$).

The own device code CC1 and the another device code CC2 described in the first to ninth embodiments are changed to any pair of the codes (CC1 to CC10) in the embodiment shown in FIG. 10 provides an optimal wireless communication between the own device and the another device performing the wireless communication.

According to the configuration and the method described above, even in a shielded building in which each room is sheltered with shielding wall (shielding member) including a floor and ceiling.

Advantageous Effect of Tenth Embodiment

According to the tenth embodiment, wireless communication between places separated by a material, i.e., a shielded yard wireless communication system, is provided because each of a plurality of wireless communication devices uses a rotating polarized wave of which propagation frequency is controllable and searches an optimal propagation frequency and performs communication using the searched optimal frequency.

Other Embodiments

The present invention is not limited to the above-described embodiments and includes various modifications. For example, the present invention is not limited to embodiments including all components described above. Further, a part of configuration of an embodiment may be replaced with a part of another configuration of an embodiment. A part or all of configuration of an embodiment can be replaced with a part or all of configuration.

Other modifications are described below.
Code of Third Wireless Communication Device in Addition to Codes CC1, CC2

In the description of the first embodiment, the first code (CC1) is assigned to the first wireless communication device 301, and the second code (CC2) is assigned to the second wireless communication device 301b.

The wireless communication is performed using orthogonality between the code CC1 and the code CC2.

Mainly, the code CC1 is used for identifying the own device, and the code CC2 is used for identifying the other devices.

However, though the code CC1 and the code CC2 are not strictly orthogonal. It is possible to provide wireless communication according to the present invention when the code CC1 and the code CC2 are approximately orthogonal each other.

As described above, unless strict orthogonality is concerned, it is possible that a third code (CC 3) is further assigned to the third radio, such that the code CC1, the code CC2, and the code CC3, which are approximately orthogonal, can be assigned. Particularly, a longer code increases approximation accuracy.

As described above, when setting the code CC1, the code CC2, and the code CC3 which are approximately orthogonal can be made, the wireless communication device 301 can perform the wireless communication with the second wireless communication device 301b. When the wireless communication device 301 is performed with the second wireless communication device 301b, the wireless communication device 301 uses the code CC1 and the code CC2.

When the wireless communication device 301 performs wireless communication with the third wireless communication device, the communication can be provided by changing the code from the code CC2 in the second reception code generator (CC2) 45 to the code CC3 in the configuration of the first transmission code generator (CC1) 11, the first reception code generator (CC1) 41, and the second reception code generator (CC2) 45.

Further, not only three wireless communication devices, but also four or more wireless communication devices, i.e., the wireless communication according to the embodiments among N wireless communication devices, can be provided only by assigning N pairs of codes approximately orthogonal. When N is large, increasing a length of code, it is possible to provide combination of a plurality of codes (identification codes) having approximately orthogonal.

According to this principle, it is possible to perform wireless communication as described in the tenth embodiment among a plurality of wireless communication devices.

A Plurality of Propagation Frequencies

In the first embodiment, a value of the frequency ($\omega_C$) is searched, the value making maximum the ratio of the signal intensity of the demodulation signal by the specific code by the another device measured by the another device code demodulation result measurement circuit 3 (103) to the signal intensity of the demodulated signal by the specific doe of own device measured by the own device code demodulation result measurement circuit 2 (102).

However, the frequency which provides a maximum ratio is not limited to the frequency ($\omega_C$) suited for the wireless communication system.

When the carrier frequency (propagation frequency) is changed, though the ratio does not reach the maximum ($\omega_C$), there may be a plurality of carrier frequencies providing the ratio of two signal strength sufficiently usable in practical use.

In such a case, out of a plurality of carrier wave frequencies satisfying a practically usable condition, the frequencies having largest ratios between two signal strengths are recorded. When the frequency providing the maxim ratio becomes not suitable, there is a method of using the carrier frequency providing the second best ratio and the frequency is selected from the greater ratio.

Orthogonal Relation Between First and Second Antennas

For example, in the first embodiment, it is described that the first antenna (V) 21 and the second antenna (H) 22 have a spatially orthogonal relation therebetween.

It is desirable that the first antenna (V) 21 and the second antenna (H) 22 are orthogonal. However, strictly orthogonality is not always required.

If the relation is not accurately 90 degrees (orthogonal), as long as the first antenna (V) 21 and the second antenna (H) 22 are not parallel, there are polarized wave having orthogonal components, there is the operation and an advantageous effect described in the first embodiment.

In other words, orthogonality of the first antenna (V) 21 and the second antenna (H) 22 is not strictly required, if these antennas are not in parallel.

This is also applied to the second to the ninth embodiments.

Circulator and Antenna Switch

In the third embodiment shown in FIG. 3, it is described that the antenna switching devices 25, 26 in a wireless communication device 303 are used in place of the circulators 23, 24. However, this not limited to the second embodiment shown in FIG. 2.

In the embodiments shown in FIGS. 4 to 9, the circulators 23, 24 can be replaced with the antenna switching devices 25, 26. This provides an advantageous effect in down-sizing and cost saving of the devices. Reception adder and transmission adder In the wireless communication device 309 according to the ninth embodiment shown in FIG. 9, the variable frequency second frequency sine local wave generator (sin $\omega_2 t$) 57 generates the sine wave generator having a negative sine (−sin $\omega_2 t$).

Use of the sine wave (−sin $\omega_2 t$) having the negative sign results in using the reception subtractor 49 in the embodiment shown in FIG. 4. On the other hand, in FIG. 9, use of the reception adder 239 allows the same reception adders to be used as a plurality of reception adders.

There may be a difference in electric characteristic among the reception subtractor and the reception adder in operation period for calculation or a delay time. Accordingly, there may be a case in which the electrical characteristic becomes stable by using the device as the reception adder relative to the case in which the reception subtractor and the reception adders are used in mixed manner.

Transmission Frequency and Reception Frequency of Wireless Communication Device

In the first embodiment shown in FIG. 1, it is described that the carrier frequency (transmission propagation frequency and the reception frequency are the same. However, it is also possible to use different frequencies.

For example, in FIG. 1, the reception multiplier 32 and the reception multiplier 33 are supplied, at second inputs, with the signal from the variable frequency local wave generator 31. However, another configuration may be provided. More specifically, another variable frequency local wave generator is provided. The signals from the variable frequency local wave generators having different frequencies are supplied to the second inputs of the reception multiplier 32 and the reception multiplier 33 separately.

The two variable frequency local wave generators are modified to have a wider frequency variable range to make it possible to easily select two different frequencies.

The second wireless communication device 301b in FIG. 1 is also modified to have the same configuration.

As described above, separately selecting the transmission frequency and the receiving frequency provides frequency diversity between transmission and receiving frequency, which has an advantage even in the case in which the specific codes for identifying respective wireless communication device become insufficient. This increases convenience in the wireless communication system.

Three Orthogonal Polarization Antennas

In the first embodiment, it was described that the first antenna (V) 21 and the second antenna (H) 22 are spatially orthogonal.

However, the spatial orthogonality of the transmission antennas are not limited to two directions, i.e., the vertical direction (V) and the horizontal direction (H).

Not only to the vertical direction (V) and the horizontal direction (H) but also in a normal direction (N) a transmission is further provided to have a three-dimensionally orthogonal to create spherical polarized wave (rotating polarized wave). This is applied to the method described in the first embodiment.

Though a detailed description is omitted, this provides increase in accuracy, maintaining or improving a communication quality.

DESCRIPTION OF REFERENCE SYMBOLS 1, 101, 201 information signal generator
2, 102, 202 own device code demodulation result measurement circuit
3, 103, 203 another device code demodulation result measurement circuit
11, 211 first transmission code generator 12, 14, 16, 18, 19, 62, 64, 66, 68, 72, 74, 112, 114, 116, 118, 119, 212 transmission multiplier
13, 34, 113, 134 rotating polarized wave frequency cosine wave generator
15, 36, 115, 136 rotating polarized wave frequency sine wave generator 17, 117 variable frequency transmission carrier generator
21, 121, 1002 first antenna
22, 122, 1003 second antenna
23, 24, 123, 124 circulator
25, 26 antenna switching device
27 transmission adder
28 transmission subtractor
31, 131 variable frequency local wave generator
32, 33, 35, 37, 43, 47, 52, 54, 56, 58, 132, 133, 135, 137, 143, 147, 243, 247 reception multiplier
38, 48, 138, 239 reception adder
41, 145 first reception code generator
42, 46, 142, 146, 242, 246 code circulator
49 reception subtractor
51 variable frequency first frequency cosine local wave generator
53 variable frequency second frequency cosine local wave generator
55 variable frequency first frequency sine local wave generator
57 variable frequency second frequency sine local wave generator
61 variable frequency first frequency cosine carrier wave generator
63 variable frequency second frequency cosine carrier wave generator
65 variable frequency first frequency sine carrier wave generator
67 variable frequency second frequency sine carrier wave generator
71, 73 polarization wave discriminating code generator
81, 84 polarized wave identification orthogonal code generator
82, 85 synchronizing code generator
83, 86, 89 code switch
87, 88, 95 first synchronizing code generator
90, 91, 190 baseband circuit
96 second specific synchronizing code generator
111 second reception code generator
213, 234 variable frequency rotating polarized wave frequency cosine wave generator
215, 236 variable frequency rotating polarized wave frequency sine wave generator
214, 216, 272, 274 transmission digital multiplier
217, 231 local wave generator
235, 237 reception digital multiplier
238 reception digital synthesizing circuit
301, 301b, 302, 303, 304, 305, 306, 307, 308, 309, 1010 wireless communication device
301T, 301Tb, 304T, 305T, 306T, 307T, 309T transmitter
301R, 301Rb, 304R, 305R, 306R, 307R, 309R receiver
511 clock supplying circuit
512, 513 delta-sigma circuit
515, 516 filter
521, 523 threshold generator
521 522, 524 comparator
900 digital signal processing unit (digital signal processing device)
1001 own device code
1011 shielding wall
1012 room
1020 shielded yard
1100 shielded yard wireless communication system

The invention claimed is:

1. A wireless communication system comprising:
a plurality of wireless communication devices which are separately disposed, each of wireless communication devices including two antennas having a spatially non-parallel relation with each other, a transmitter, and a receiver, the transmitter and the receiver transmitting and receiving rotating polarized waves while the transmitter and the receiver vary propagation frequencies, respectively;
wherein specific codes are assigned to the wireless communication devices, respectively; and
wherein the wireless communication devices share the specific codes respectively assigned to the wireless communication devices;
the wireless communication devices include a first device that superimposes first information together with the specific code of the first wireless communication device as an own device on a propagation frequency to generate and transmit a first superimposed signal as an electromagnetic wave which is a rotating polarized wave;
wherein the wireless communication devices include a second device that superimposes second information together with the specific code of the second wireless communication device as an own device on a propagation frequency to generate and transmit a second superimposed signal as an electromagnetic wave which is a rotating polarized wave;
the first device receives the first superimposed signal and the second superimposed signal as a received signal and reproduces, from the received signal, the first information with the specific code assigned to the first device as an own device and the second information with the specific code assigned to the second device as another device;
the second device receives the first superimposed signal and the second superimposed signal as a received signal and reproduces, from the received signal, the second information with the specific code assigned to the second device as an own device and the first information with the specific code assigned to the first device as another device;
wherein each of the first and second devices adjusts the propagation frequency thereof so as to have a maximum ratio of an intensity of a signal reproduced from the received signal thereof with the specific code assigned to the another device to an intensity of a signal reproduced from the received signal thereof with the specific code assigned to the own device.

2. The wireless communication system as claimed in claim 1, wherein the two antennas are spatially orthogonal with each other.

3. The wireless communication system as claimed in claim 1,
wherein the first and second devices superimpose identification codes for identifying a predetermined part within one cycles of rotation of the polarized waves on the first and second information, respectively; and
wherein each of the first and second devices uses a polarized direction of the rotating polarized wave to have the maximum ratio of the intensity of the signal reproduced from the received signal thereof with the specific code assigned to the another device to the intensity of the signal reproduced from the received signal thereof with the specific code assigned to the own device.

4. The wireless communication system as claimed in claim 1, wherein each of the first and second devices uses a propagation frequency and time in one cycle of rotation of polarized wave corresponding to the polarized direction of the rotating polarized wave to have the maximum ratio of the intensity of the signal reproduced from the received signal thereof with the specific code assigned to the another device to the intensity of the signal reproduced from the received signal thereof with the specific code assigned to the own device.

5. The wireless communication system as claimed in claim 1, wherein each of the first and second devices has a period for searching the propagation frequency which provides the maximum ratio of the intensity of the signal reproduced from the received signal thereof with the specific code assigned to the another device to the intensity of the signal reproduced from the received signal thereof with the specific code assigned to the own device and performs wireless communication using the propagation frequency obtained from a result of the searching in another period different from the period.

6. The wireless communication system as claimed in claim 1, wherein each of the first and second devices reduces a transmission power at a propagation frequency and time other than time in one cycle of rotation of polarized wave corresponding to the polarized direction of the rotating polarized wave providing the maximum ratio of the intensity of the signal reproduced from the received signal thereof with the specific code assigned to the another device to the intensity of the signal reproduced from the received signal thereof with the specific code assigned to the own device.

7. The wireless communication system as claimed in claim 1, wherein each of the first and second devices measures a value of the propagation frequency providing the maximum ratio of the intensity of the signal reproduced from the received signal thereof with the specific code assigned to the another device to the intensity of the signal reproduced from the received signal with the specific code assigned to the own device for each code and uses one of a plurality of propagation frequencies in a descending order of the ratio.

8. The wireless communication system as claimed in claim 1, wherein each of the first and second devices has a transmission frequency as the propagation frequency of the own device and a receiving frequency as the propagation frequency of the another device which are different from each other.

9. The wireless communication system as claimed in claim 1, wherein the specific codes of the first and second devices have high autocorrelation characteristics and low cross-correlation characteristics, respectively.

10. The wireless communication system as claimed in claim 1, wherein a rotating frequency is less than one tenth of the propagation frequency.

11. The wireless communication system as claimed in claim 1, wherein when the first device communicates with a third device of the wireless communication devices, the first device replaces the specific code of the another device from the specific code of the second device to the specific code of the third device, and the third device sets the specific code of the first device as the another device.

12. The wireless communication system as claimed in claim 1, further comprising:

a shield member which separates the wireless communication devices.

13. A wireless communication device comprising:
a transmitter, a receiver, and two antennas:
wherein the two antennas are spatially orthogonal with each other and shared by the transmitter and the receiver,
wherein the transmitter comprises:
an information signal generator that generates an information signal for wireless communication;
a transmission carrier generating circuit that generates a carrier wave;
a rotating polarized wave frequency cosine wave generator that generates a cosine wave;
a rotating polarized wave frequency sine wave generator that generates a sine wave; and
a first transmission code generator that generates a specific code for the wireless communication device as an own device;
wherein the information signal is spread using the first transmission code generator, the spread signal is superimposed on the cosine wave and the carrier wave and on the sine wave and the carrier wave to generate a first superimposed signal as an electromagnetic wave which is a rotating polarized wave, and the first superimposed signal is transmitted by the two antennas,
wherein the two antennas receive a second superimposed signal as an electromagnetic wave which is a rotating polarized wave,
wherein the receiver comprises:
a variable frequency local wave generator that generates a cosine wave having a same frequency as the carrier wave generated by the variable frequency transmission carrier generator;
a rotating polarized wave frequency cosine wave generator that generates a sine wave for the second superimposed signal;
a rotating polarized wave frequency sine wave generator that generates a cosine wave for the second superimposed signal;
a first reception code generator that generates the specific code of the own device for the receiver;
a second reception code generator that generates a specific code of another device for the receiver;
a first code circulator that circulates the specific code of the own device;
a second code circulator that circulates the specific code of the another device,
wherein the cosine wave having the same frequency as the carrier wave, the cosine wave for the second superimposed signal, and the sine wave for the second superimposed signal are removed from the second superimposed signal to generate a down-converted signal,
wherein the receiver further comprises:
an own device code demodulation result measurement circuit that measures an intensity of a received signal including the specific code of own device from a correlation calculation result of the circulated specific code of the own device and the down-converted signal;
another device code demodulation result measurement circuit that measures an intensity of a received signal including the specific code of the another device from a correlation calculation result of the circulated specific code of the another device and the down-converted signal,
wherein the transmission carrier generating circuit adjusts the frequency of the carrier wave thereof so as to have a maximum ratio of an intensity of a signal reproduced from the received signal including the specific code assigned to the another device to an intensity of a signal reproduced from the received signal with the specific code of the own device.

\* \* \* \* \*